(12) United States Patent
Goto et al.

(10) Patent No.: US 7,331,247 B2
(45) Date of Patent: Feb. 19, 2008

(54) RELATIVE ROTATIONAL POSITION DETECTION APPARATUS HAVING MAGNETIC COUPLING BOUNDARY SECTIONS THAT FORM VARYING MAGNETIC COUPLINGS

(75) Inventors: Atsutoshi Goto, Fuchu (JP); Kazuya Sakamoto, Hamura (JP); Hiroshi Sakamoto, Kawagoe (JP)

(73) Assignee: Amiteq Co., Ltd. (JP)

( * ) Notice: Subject to any disclaimer, the term of this patent is extended or adjusted under 35 U.S.C. 154(b) by 0 days.

(21) Appl. No.: 10/569,997

(22) PCT Filed: Aug. 27, 2004

(86) PCT No.: PCT/JP2004/012381

§ 371 (c)(1),
(2), (4) Date: Feb. 28, 2006

(87) PCT Pub. No.: WO2005/022103

PCT Pub. Date: Mar. 10, 2005

(65) Prior Publication Data

US 2007/0007950 A1    Jan. 11, 2007

(30) Foreign Application Priority Data

Aug. 28, 2003 (JP) .............................. 2003-305373

(51) Int. Cl.
*G01L 3/00* (2006.01)

(52) U.S. Cl. .............................. 73/862.331; 73/862.08; 73/862.333

(58) Field of Classification Search ............. 73/862.08, 73/862.331, 862.333
See application file for complete search history.

(56) References Cited

U.S. PATENT DOCUMENTS 5,083,468 A    1/1992   Dobler et al.

(Continued)

FOREIGN PATENT DOCUMENTS

JP           3-500204 A       1/1991

(Continued)

OTHER PUBLICATIONS

Relevant portion of International Search Report of corresponding PCT Application PCT/JP2004/012381.

(Continued)

*Primary Examiner*—Edward Lefkowitz
*Assistant Examiner*—Jermaine Jenkins
(74) *Attorney, Agent, or Firm*—Rossi, Kimms & McDowell LLP

(57) ABSTRACT

First and second shafts (1, 2) are interconnected via a torsion bar (3) for torsional (or rotational) movement relative to each other, and first and second magnetic body sections (10, 20) are provided to rotate in interlocked relation to the rotation of the first and second shafts, respectively. The first and second magnetic body sections form at least two ring-shaped variable magnetic coupling sections opposed to each other via a gap, magnetic coupling in each of the boundary sections varies in response to variation of a relative rotational position between the first and second shafts, and variation of the magnetic coupling differs in phase between the boundary sections. Coil section (30) includes magnetic-coupling detecting coils (L1-L4) provided in corresponding relation to the boundary sections. Each of the first and second magnetic body sections is of a cylindrical shape and has a plurality of magnetic teeth formed at unequal pitches along the circumferential direction thereof, and the magnetic teeth differ in axial length among tooth groups corresponding to the boundary sections.

9 Claims, 16 Drawing Sheets

U.S. PATENT DOCUMENTS

| | | | |
|---|---|---|---|
| 5,269,192 A | | 12/1993 | Utsui et al. |
| 6,034,624 A | * | 3/2000 | Goto et al. .............. 340/870.32 |
| 6,163,148 A | * | 12/2000 | Takada et al. .............. 324/226 |
| 6,382,034 B1 | * | 5/2002 | Yasui et al. .............. 73/862.08 |
| 6,386,052 B1 | | 5/2002 | Satoh et al. |
| 6,581,479 B2 | | 6/2003 | Goto et al. |

FOREIGN PATENT DOCUMENTS

| | | | |
|---|---|---|---|
| JP | 06174569 A | * | 6/1994 |
| JP | 2000-111428 A | | 4/2000 |
| JP | 2002-310816 A | | 10/2002 |

OTHER PUBLICATIONS

Relevant Portion of Supplementary European Search Report dated Feb. 20, 2007 for corresponding European Patent Application No. 04772337.4-1236.

* cited by examiner

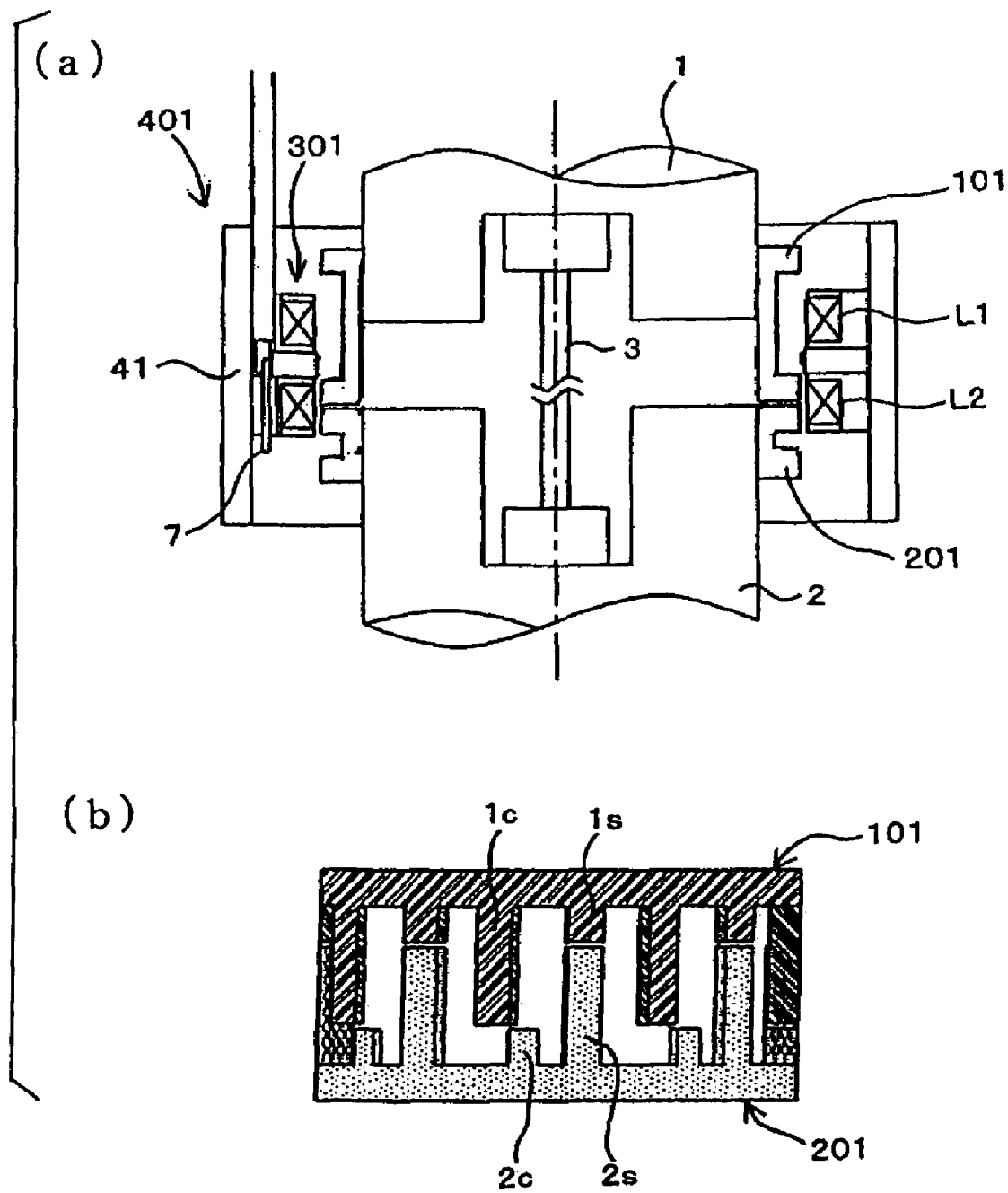
F I G. 8

RELATIVE ROTATIONAL POSITION DETECTION APPARATUS HAVING MAGNETIC COUPLING BOUNDARY SECTIONS THAT FORM VARYING MAGNETIC COUPLINGS

This application is a U. S. National Phase Application of PCT International Application PCT/JP2004/012381 filed on Aug. 27, 2004.

TECHNICAL FIELD

The present invention relates to an improved apparatus for detecting a relative rotational position between two shafts, which is suitable for use as, for example, a torque sensor for detecting a torsional load applied to a power steering shaft of a motor vehicle.

BACKGROUND ART

Of various types of techniques for detecting torsional amounts of two relatively-rotatable shafts, there have been well known those which are characterized by provision of detection devices, such as a potentiometer or resolver devices, on input and output shafts interconnected via a torsion bar. According to the above-mentioned technique using a potentiometer, a slider is mounted on the input shaft while a resistor is mounted on the output shaft, so that a position of the slider contacting the resistor varies in accordance with variation in a relative rotational position between the input and output shafts to thereby provide an analog voltage corresponding to the relative rotational position. According to the technique using resolver devices, separate resolver devices are provided on both of the input and output shafts so as to detect a relative rotational amount (torsional amount) between the two shafts on the basis of angle signals output from the two resolver devices. Further, as a means for detecting a relative rotational displacement between two relatively-rotatable shafts, there has been developed a noncontact-type torque sensor for electronic power steering which employs an induction coil (see Japanese Patent Application Laid-open Publication No. HEI-6-174570).

Inventions disclosed in Japanese Patent Application Laid-open Publication Nos. 2000-55610, 2002-48508, 2002-107110 and 2002-310816 were each proposed with a view to avoiding the drawbacks of the above-discussed prior art, and each of these proposed inventions employs a noncontact-type and induction- or variable-magnetic-coupling-type sensor that uses a coil section and magnetism-responsive member (magnetic substance or electrically-conductive substance). Each of these inventions is suited for accurate detection by a phase detection scheme.

The conventional technique of the type using a potentiometer would always suffer from poor electrical contact, failure and/or other problem since the electrical contact is implemented via a mechanical contact structure. Further, because there occurs impedance variation due to temperature changes, it is necessary to appropriately carry out temperature drift compensation. Further, the conventional rotational-displacement detection apparatus, known as the noncontact-type torque sensor for electric power steering employing the induction coil, is arranged to measure an analog voltage level produced in response to a minute relative rotational displacement, so that it would accomplish only a very poor detecting resolution. Further, in addition to the need to compensate temperature drift characteristics of the coil, there is a need to appropriately compensate temperature drift characteristics present in reluctance of magnetic substances that vary magnetic coupling to the coil in response to a changing relative rotational position as well as in eddy current loss of electrically-conductive substances. Furthermore, for application to a torque sensor, it is necessary to precisely detect a minute rotational angle, and thus, with the detection apparatus using a noncontact-type and induction- or variable-magnetic-coupling-type sensor as disclosed in any one of the above-identified patent literatures, it is desirable to make arrangements for providing sufficient output voltage levels of the sensor coil.

DISCLOSURE OF THE INVENTION

In view of the foregoing, it is an object of the present invention to provide an improved relative-rotational-position detection apparatus which is of a type suited for precise detection based on a phase detection scheme and which can precisely detect even a minute rotational angle by permitting a sufficient gain of an output voltage level of a sensor coil.

The present invention provides a relative rotational position detection apparatus for detecting a relative rotational position between first and second shafts rotatable relative to each other, which comprises: a first magnetic body section provided to rotate in intercoupled relation to rotation of the first shaft; a second magnetic body section provided to rotate in intercoupled relation to rotation of the second shaft; wherein the first magnetic body section and the second magnetic body section form at least two ring-shaped variable magnetic coupling sections opposed to each other via a gap, magnetic coupling in each of the boundary sections varying in response to variation of the relative rotational position between the first shaft and the second shaft, variation of the magnetic coupling being different in phase between the boundary sections; and a coil section including detecting coils provided in corresponding relation to the individual boundary sections.

The first magnetic body section and the second magnetic body section, which rotate in response to rotation between the first and second shafts, together form at least two ring-shaped variable magnetic coupling sections opposed to each other via a gap, and variation of magnetic coupling is different in phase between the boundary sections. Thus, there can be provided a relative rotational position detection apparatus suited to phase detection principles. Because the magnetic-coupling detecting coils can be positioned to cover the whole of the ring-shaped variable magnetic coupling boundary sections in the first and second magnetic body sections, it is possible to provide a sufficient gain of an output voltage level. As a consequence, even a minute rotational angle can be detected with high accuracy.

Preferably, the relative rotational position detection apparatus of the present invention further comprises a circuit for synthesizing respective output signals of the coils of the coil section, to thereby generate an output A.C. signal shifted in phase from a reference A.C. signal in accordance with a relative rotational position between the first shaft and the second shaft.

Further, preferably, one of the boundary sections presents magnetic coupling variation of a sine characteristic in response to variation of the relative rotational position between the first shaft and the second shaft, and the other of the boundary sections presents magnetic coupling variation of a cosine characteristic in response to variation of the relative rotational position between the first shaft and the second shaft.

In an embodiment according to a first aspect of the present invention, the first and second magnetic body sections each comprise a cylindrical member having a plurality of magnetic teeth formed at unequal pitches along the circumferential direction thereof, and the plurality of magnetic teeth form groups corresponding to the plurality of boundary sections. The magnetic teeth in each of the first and second magnetic body sections differ in axial length among the groups, and the magnetic teeth of each of the groups in the first and second magnetic body sections are opposed to each other to thereby form the boundary section corresponding to the group, so that the individual boundary sections are provided in positions offset from one another in the axial direction. As a result, the present invention permits highly-accurate detection despite an extremely simple apparatus structure.

In an embodiment according to a second aspect of the present invention, the first magnetic body section has a plurality of first magnetic rings axially spaced apart from each other, while the second magnetic body section has a plurality of second magnetic rings axially spaced apart from each other. Individual ones of the second magnetic rings are positioned alternately between the first magnetic rings and connected with each other via connection means for rotation with the second shaft. Further, opposed surfaces of the first magnetic rings and the second magnetic rings form an increase/decrease pattern of magnetic substance in such a manner that the boundary sections are formed between adjoining ones of the plurality of first magnetic rings and the plurality of second magnetic rings. In this case, four the boundary sections may be formed between adjoining ones of the plurality of first magnetic rings and the plurality of second magnetic rings. For example, a first one of the boundary sections presents magnetic coupling variation of a sine characteristic in response to variation of the relative rotational position between the first shaft and the second shaft, a second one of the boundary sections presents magnetic coupling variation of a cosine characteristic in response to variation of the relative rotational position between the first shaft and the second shaft, a third one of the boundary sections presents magnetic coupling variation of a minus sine characteristic in response to variation of the relative rotational position between the first shaft and the second shaft, and a fourth one of the boundary sections presents magnetic coupling variation of a minus cosine characteristic in response to variation of the relative rotational position between the first shaft and the second shaft.

BRIEF DESCRIPTION OF DRAWINGS

FIG. 8 is a schematic sectional side view showing another embodiment of the relative rotational position detection apparatus in accordance with the first aspect of the present invention, and a schematic side view extractively showing first and second magnetic body sections in the other embodiment;

BEST MODE FOR CARRYING OUT THE INVENTION

Now, embodiments of the present invention will be described with reference to the accompanying drawings.

Figure 1:
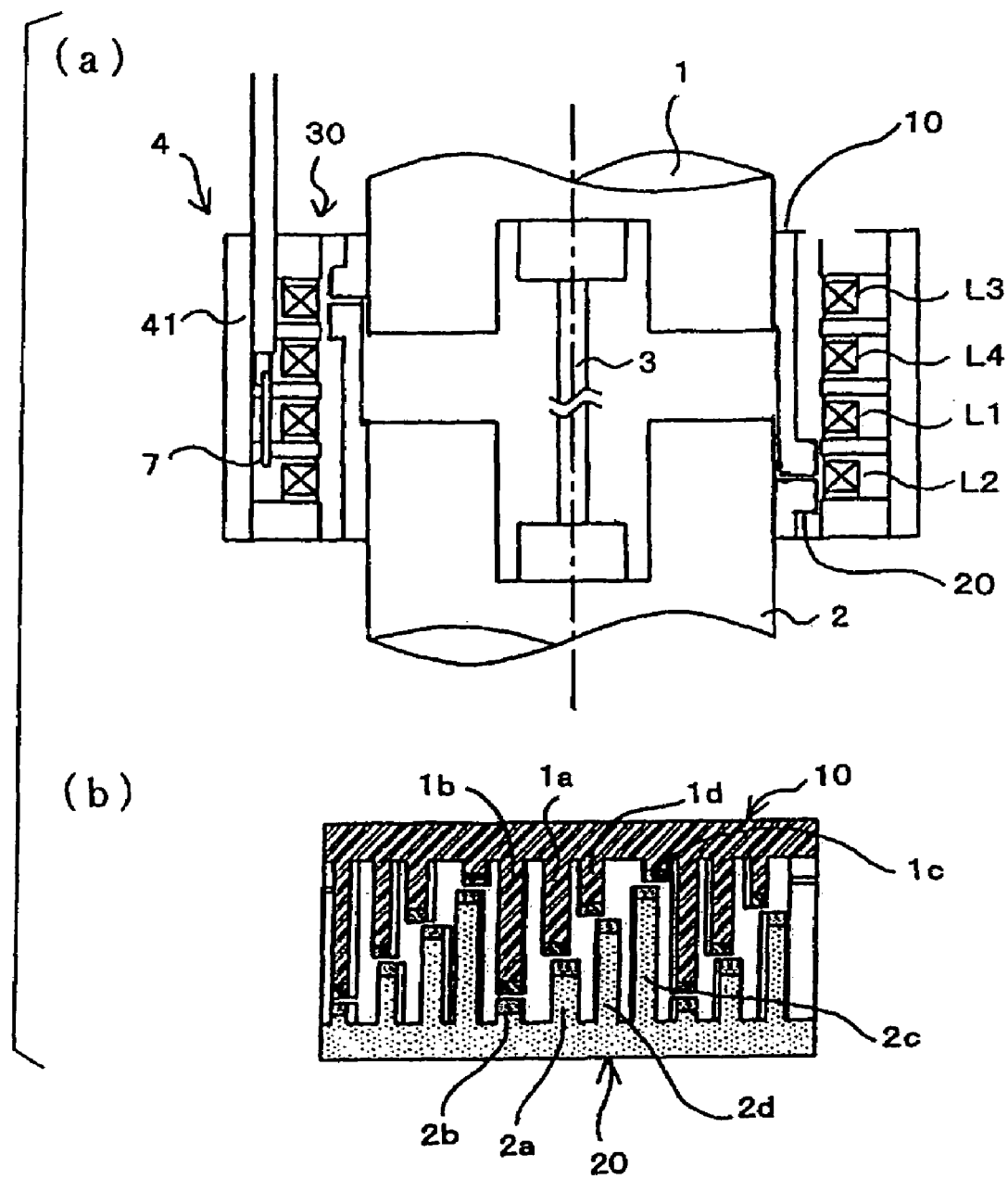
FIG. 1 is a sectional side view schematically showing an embodiment of a relative rotational position detection apparatus in accordance with a first aspect of the present invention, and a schematic side view extractively showing first and second magnetic body sections in the embodiment.

FIG. 1(*a*) is a partly-sectional side view schematically showing an embodiment of a relative rotational position detection apparatus in accordance with a first aspect of the present invention. The embodiment of the relative rotational position detection apparatus is constructed as a torque detection apparatus 4 for detecting torsional torque acting on a torsion bar 3 of a steering shaft connected to a steering wheel of a motor vehicle. Note that, in FIG. 1(*a*) and other sectional or partly-sectional schematic views in the accompanying drawings, no hatching is used to indicate sectional surfaces.

In FIG. 1(*a*), input and output shafts 1 and 2 are interconnected by the torsion bar 3, and these input and output shafts 1 and 2 are rotatable relative to each other through a limited angular range (e.g., from +7 degrees to –7 degrees at the most) so far as torsional deformation of the torsion bar 3 permits. Construction of such two shafts (input and output shafts 1 and 2) interconnected by the torsion bar 3 is the same as conventionally known in power steering mechanisms of motor vehicles. Whereas the instant embodiment of the relative rotational position detection apparatus (torque detection apparatus 4) is described here as applied as a torque sensor for detecting torsional torque acting on the torsion bar 3 of the power steering mechanism, the present invention is not so limited, and the relative rotational position detection apparatus of the present invention is of course applicable to all relative rotational position detection applications.

The instant embodiment of the relative rotational position detection apparatus (torque detection apparatus 4) comprises a first magnetic body section (also referred to as "input shaft rotor") 10 provided for rotation in intercoupled relation to rotation of the input shaft 1, a second magnetic body section (also referred to as "output shaft rotor") 20 provided for rotation in intercoupled relation to rotation of the output shaft 2, and a coil section 30. The first magnetic body section (input shaft rotor) 10 and the second magnetic body section (output shaft rotor) 20 are opposed to each other in a noncontact fashion via an appropriate airgap.

FIG. 1(*b*) is a schematic side view showing details of the first magnetic body section (input shaft rotor) 10 and second magnetic body section (output shaft rotor) 20. The first magnetic body section (input shaft rotor) 10 comprises a cylindrical member having a plurality of magnetic teeth 1*a*, 1*b*, 1*c*, 1*d*, . . . formed at unequal pitches along the circumferential direction thereof. Similarly, the second magnetic body section (output shaft rotor) 20 comprises a cylindrical member having a plurality of magnetic teeth 2*a*, 2*b*, 2*c*, 2*d*, . . . formed at unequal pitches along the circumferential direction thereof. The first magnetic body section (input shaft rotor) 10 is mounted on the input shaft 1 and rotates together with the input shaft 1. The second magnetic body section (output shaft rotor) 20 is mounted on the output shaft 2 and rotates together with the output shaft 2. The plurality of magnetic teeth 1*a*, 1*b*, 1*c*, 1*d*, . . . of the first magnetic body section (input shaft rotor) 10 form four groups a-d, and the magnetic teeth 1*a*, 1*b*, 1*c*, 1*d*, . . . differ in axial length among the groups. Similarly, the plurality of magnetic teeth 2*a*, 2*b*, 2*c*, 2*d*, . . . of the second magnetic body section (output shaft rotor) 20 form four groups a-d, and the magnetic teeth 2*a*, 2*b*, 2*c*, 2*d*, . . . differ in axial length among the groups each of the four groups. Although, in FIG. 1(*b*) and other schematic side views in the accompanying drawings, a different pattern of oblique lines is added to each different surface to distinguish among the surfaces, it should be noted that these oblique lines are never intended to indicate sectional surfaces.

Each pair of the magnetic teeth 1*a*, 1*b*, 1*c*, 1*d*, . . . of the first magnetic body section (input shaft rotor) 10 and the magnetic teeth 2*a*, 2*b*, 2*c*, 2*d*, . . . of the second magnetic body section (output shaft rotor) 20 opposed to the teeth 1*a*, 1*b*, 1*c*, 1*d*, . . . have complementary lengths so that the magnetic teeth of each of the pairs of the 1*a*, 1*b*, 1*c*, 1*d*, . . . and 2*a*, 2*b*, 2*c*, 2*d*, . . . are opposed to each other with a predetermined airgap. Namely, if the length of the magnetic teeth of each of the four groups a-d is classified into any one of "1", "2", "3" and "4" for convenience of description and if the length of the magnetic tooth 1*a* of the group a in the first magnetic body section (input shaft rotor) 10 is assumed to be "3", then the length of the magnetic tooth 2*a*, opposed thereto, of the group a in the second magnetic body section (output shaft rotor) 20 is set to "2". Regarding the group b, if the length of the magnetic tooth 1*b* is "4", then the length of the magnetic tooth 2*b* opposed thereto is set to "1". Regarding the group c, if the length of the magnetic tooth 1*c* is "1", then the length of the magnetic tooth 2*c* opposed thereto is set to "4". Further, regarding the group d, if the length of the magnetic tooth 1*d* is "2", then the length of the magnetic tooth 2*d* opposed thereto is set to "3".

With the differences in length among the magnetic teeth 1*a*, 1*b*, 1*c*, 1*d*, . . . , 2*a*, 2*b*, 2*c*, 2*d*, . . . forming the four groups a-d, there are formed four variable magnetic coupling boundary sections, between the first magnetic body section 10 and the second magnetic body section 20, in corresponding relation to the four groups a-d, and these four variable magnetic coupling boundary sections assume positions offset from one another in the axial direction.

The above-mentioned coil section 30 comprises four coils L1, L2, L3 and L4 wound around the four variable magnetic coupling boundary sections formed between the magnetic teeth 1*a*, 1*b*, 1*c*, 1*d*, . . . and 2*a*, 2*b*, 2*c*, 2*d*, . . . of the individual groups a-d of the first and second magnetic body sections 10 and 20. Namely, the coils L1-L4 are axially spaced apart from one another in correspondence with offset intervals between the four boundary sections, and the four boundary sections, formed between the magnetic teeth 1*a*, 1*b*, 1*c*, 1*d*, . . . and 2*a*, 2*b*, 2*c*, 2*d*, . . . of the first and second magnetic body sections 10 and 20, are inserted in the inner spaces of the corresponding coils L1-L4.

Figure 2:
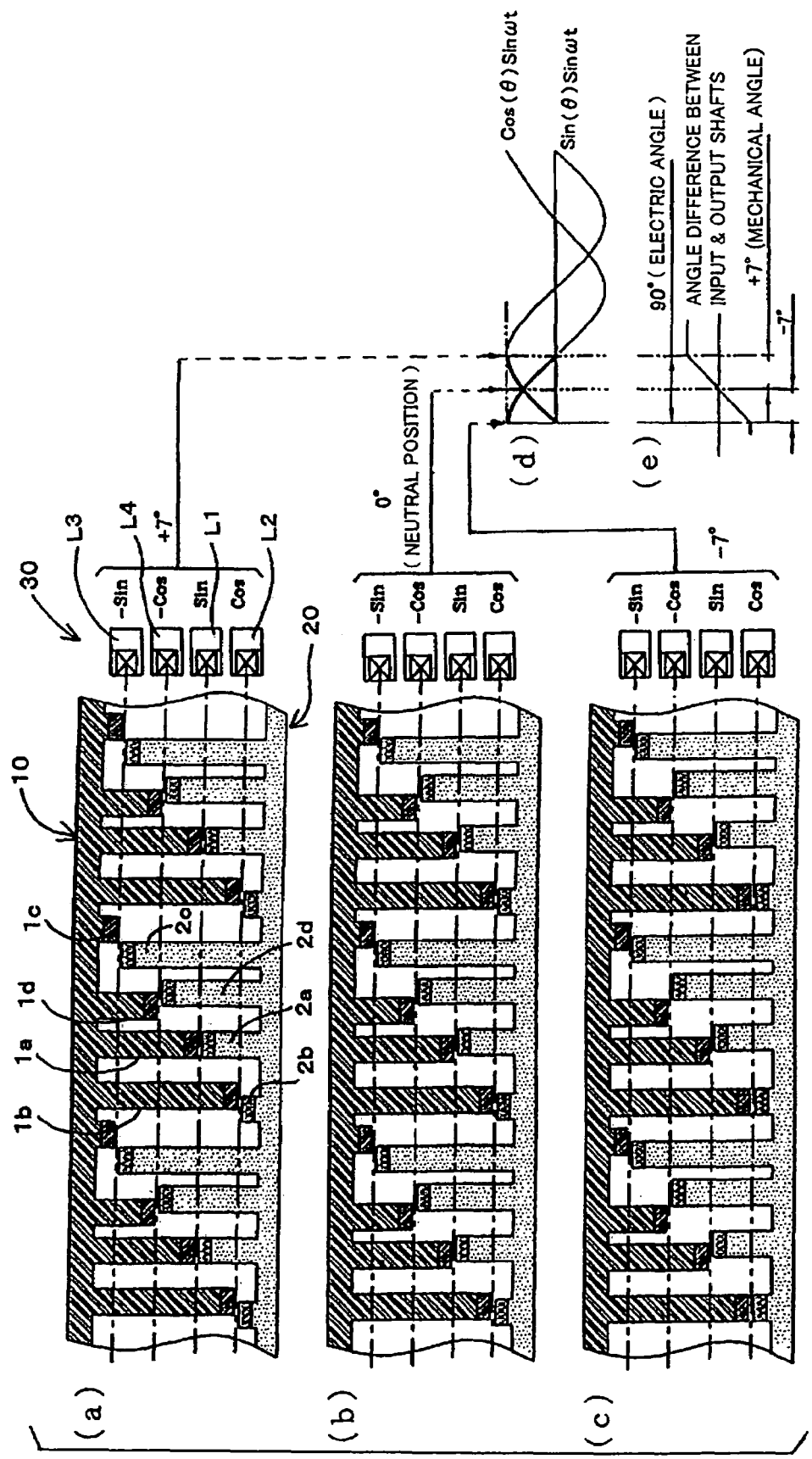
FIG. 2 is an expansion plan view showing construction of magnetic teeth of the first and second magnetic body sections and positional arrangement of corresponding coils in the embodiment of FIG. 1.

As seen in expansion plan views of FIGS. 2(*a*)-2(*c*), the unequalness in positional arrangement (pitch) of the magnetic teeth 1*a*, 1*b*, 1*c*, 1*d*, . . . and 2*a*, 2*b*, 2*c*, 2*d*, . . . of the first and second magnetic body sections 10 and 20 has predetermined regularity such that variation in the magnetic coupling occurring in the individual boundary sections assumes predetermined phase relationship in accordance with a relative rotational position between the input shaft 1 and the output shaft 2. Namely, as the correspondency between the magnetic teeth of the first and second magnetic body sections 10 and 20 varies in response to variation in the relative rotational position between the input shaft 1 and the output shaft 2, the phase of variation in the magnetic coupling degree in the boundary sections corresponding to the groups a-d will differ as follows. Although, in FIGS. 2(*a*)-2(*c*) and other expansion plan views in the accompanying drawings, a different pattern of oblique lines is added to each different surface to distinguish among the surfaces just as in FIG. 1(*b*), it should be noted that these oblique lines are never intended to indicate sectional surfaces.

For example, FIG. 2(*a*) shows exemplary correspondency between the magnetic teeth 1*a*, 1*b*, 1*c*, 1*d*, . . . of the first magnetic body section 10 and the magnetic teeth 2*a*, 2*b*, 2*c*, 2*d*, . . . of the second magnetic body section 20 when the shift amount (i.e., relative rotational position), in the clockwise direction, of the input shaft 1 with respect to the output shaft 2 is the maximum (e.g., +7 degrees). Further, FIG. 2(b) shows exemplary correspondency between the magnetic teeth 1a, 1b, 1c, 1d, . . . of the first magnetic body section 10 and the magnetic teeth 2a, 2b, 2c, 2d, . . . of the second magnetic body section 20 when the shift amount (i.e., relative rotational position) of the input shaft 1 with respect to the output shaft 2 is zero (representing a neutral position). Further, FIG. 2(c) shows exemplary correspondency between the magnetic teeth 1a, 1b, 1c, 1d, . . . of the first magnetic body section 10 and the magnetic teeth 2a, 2b, 2c, 2d, . . . of the second magnetic body section 20 when the shift amount (i.e., relative rotational position), in the counterclockwise direction, of the input shaft 1 with respect to the output shaft 2 is the maximum (e.g., −7 degrees).

For example, when, in the illustrated example of FIG. 2(a) corresponding to the maximum shift amount in the clockwise direction, the magnetic tooth 1a of the first magnetic body section 10 and the magnetic tooth 2a of the second magnetic body section 20, opposed to each other via a gap, exactly align (i.e., exactly overlap) with each other as seen in each of the boundary sections formed by the magnetic teeth 1a and 2a, belonging to the group a, of the first and second magnetic body sections 10 and 20, the magnetic coupling degree in that boundary section presents the maximum value, which may be regarded as corresponding to a value of sin 90° if converted, for example, into a sine function value. Further, when the magnetic tooth 1c of the first magnetic body section 10 and the magnetic tooth 2c of the second magnetic body section 20, opposed to each other via a gap, are shifted from (i.e., do not at all overlap with) each other as seen in each of the boundary sections formed by the magnetic teeth 1c and 2c, belonging to the group c, of the first and second magnetic body sections 10 and 20 in the illustrated example of FIG. 2(a), the magnetic coupling degree in that boundary section presents the minimum value, which may be regarded as corresponding to a value of sin 270° or −sine90° if converted, for example, into a sine function value. Namely, the magnetic coupling variation in the boundary section formed by the magnetic teeth 1a and 2a, belonging to the group a, of the first and second magnetic body sections 10 and 20 and the magnetic coupling variation in the boundary section formed by the magnetic teeth 1c and 2c, belonging to the group c, of the first and second magnetic body sections 10 and 20 assume mutually-opposite phase relationship. Furthermore, when the magnetic tooth 1b of the first magnetic body section 10 and the magnetic tooth 2b of the second magnetic body section 20, opposed to each other via a gap, overlap with each other by an amount corresponding exactly to one half (½) of a horizontal tooth width as seen in each of the boundary sections formed by the magnetic teeth 1b and 2b, belonging to the group b, of the first and second magnetic body sections 10 and 20 in the illustrated example of FIG. 2(a), the magnetic coupling degree in that boundary section presents a middle value between the maximum value and the minimum value, which may be regarded as corresponding to a value of cos 90° if converted, for example, into a sine function value. Furthermore, when the magnetic tooth 1d of the first magnetic body section 10 and the magnetic tooth 2d of the second magnetic body section 20, opposed to each other via a gap, overlap with each other by an amount corresponding exactly to one half (½) of the horizontal tooth width, in an opposite phase to the aforementioned, in each of the boundary sections formed by the magnetic teeth 1d and 2d, belonging to the group d, of the first and second magnetic body sections 10 and 20 in the illustrated example of FIG. 2(a), the magnetic coupling degree in that boundary section presents a middle value between the maximum and minimum values, which may be regarded as corresponding to a value of −cos 90° if converted, for example, into a sine function value.

In the illustrated example of FIG. 2(b) corresponding to the neutral position, the magnetic teeth 1a and 2a, belonging to the group a, of the first and second magnetic body sections 10 and 20 overlap with each other by an amount corresponding to about three-fourths (¾) of the horizontal tooth width, and the magnetic coupling degree in the boundary section corresponds to a value of sin 45° if converted into a sine function value. At that time, the magnetic teeth 1c and 2c, belonging to the group c, of the first and second magnetic body sections 10 and 20 overlap with each other by an amount corresponding to about one-fourth (¼) of the horizontal tooth width, and the magnetic coupling degree in the boundary section corresponds to a value of −sin 45° if converted into a sine function value. Further, in this neutral position, the magnetic teeth 1b and 2b, belonging to the group b, of the first and second magnetic body sections 10 and 20 overlap with each other by an amount corresponding to about three-fourths (¾) of the horizontal tooth width, and the magnetic coupling degree in the boundary section corresponds to a value of cos 45° if converted into a sine function value. At that time, the magnetic teeth 1d and 2d, belonging to the group d, of the first and second magnetic body sections 10 and 20 overlap with each other by an amount corresponding to about one-fourth (¼) of the horizontal tooth width, and the magnetic coupling degree in the boundary section corresponds to a value of −cos 45° if converted into a sine function value.

Further, in the illustrated example of FIG. 2(c) corresponding to the maximum shift in the counterclockwise direction, the magnetic teeth 1a and 2a, belonging to the group a, of the first and second magnetic body sections 10 and 20 overlap with each other by an amount corresponding to one half (½) of the horizontal tooth width, and the magnetic coupling degree in the boundary section corresponds to a value of sin 0° if converted into a sine function value. At that time, the magnetic teeth 1c and 2c, belonging to the group c, of the first and second magnetic body sections 10 and 20 overlap with each other by an amount corresponding to one half of the horizontal tooth width and in an opposite phase to the above-mentioned, and the magnetic coupling degree in the boundary section corresponds to a value of −sin 0° if converted into a sine function value. Further, in this position, the magnetic teeth 1b and 2b, belonging to the group b, of the first and second magnetic body sections 10 and 20 exactly overlap with each other, and the magnetic coupling degree in the boundary section corresponds to a value of cos 0° if converted into a sine function value. At that time, the magnetic teeth 1c and 2c, belonging to the group c, of the first and second magnetic body sections 10 and 20 are displaced from each other by an amount corresponding exactly to the horizontal tooth width (namely do not at all overlap with each other), and the magnetic coupling degree in the boundary section corresponds to a value of −cos 0° if converted into a sine function value.

In this way, relative rotational positions (torsion amounts of the torsion bar 3) over a range of about 14 degrees from the maximum counterclockwise shift amount (about −7 degrees) to the maximum clockwise shift amount clockwise direction (about +7 degrees) between the input shaft 1 and the output shaft 2 appear as magnetic coupling variation in a range of about 90°, i.e. from sin 0° to sin 90° (or from −sin 0° to −sin 90°, from cos 0° to cos 90° or from −cos 0° to −cos 90°) in terms of the sine function value. Thus, by measuring the magnetic coupling variation via the coil section 30, it is possible to detect any relative rotational position (torsion amount of the torsion bar 3).

The individual coils L2, L1, L4 and L3 of the coil section 30 are energized by a common reference A.C. signal (e.g., sin ωt). As the magnetic coupling in each of the boundary sections of the individual groups a-d of the first and second magnetic body sections 10 and 20 varies in response to variation in the relative rotational position between the input shaft 1 and the output shaft 2, impedance of the coils L2, L1, L4 and L3 corresponding to the boundary sections (namely, groups a-d) varies. In the illustrated example of FIG. 2, the impedance variation can be expressed in a range of about 90 degrees if converted to a sine function value as regards the relative rotational position (torsion amount of the torsion bar 3) over the about −40° range. Thus, detecting a phase value θ of the sine function value, indicative of the impedance variation corresponding to the relative rotational position (torsion amount of the torsion bar 3), can make absolute detection of the relative rotational position, i.e. torsion amount.

The impedance variation can be expressed as follows, using an angular variable θ in an angular range of about 90 degrees. Impedance variation $A(\theta)$ of an ideal sine function characteristic occurring in the coil L1 that produces an output responsive to the magnetic coupling of the above-mentioned group a can be expressed equivalently by the following mathematical expression:

$$A(\theta) = P_0 + P \sin \theta$$

Because the impedance variation does not take a negative value (or does not enter a negative value region), the offset constant $P_0$ is equal to or greater than the amplitude coefficient P (i.e., $P_0 \geq P$), and the sum "$P_0 + P \sin \theta$" does not take a negative value in the mathematical expression above.

Further, ideal impedance variation $B(\theta)$ occurring in the coil L2 that produces an output responsive to the magnetic coupling of the above-mentioned group b can be expressed equivalently by the following mathematical expression of a cosine function characteristic:

$$B(\theta) = P_0 + P \cos \theta$$

Further, ideal impedance variation $C(\theta)$ occurring in the coil L3 that produces an output responsive to the magnetic coupling of the above-mentioned group c can be expressed equivalently by the following mathematical expression of a minus sine function characteristic:

$$C(\theta) = P_0 - P \sin \theta$$

Furthermore, ideal impedance variation $D(\theta)$ occurring in the coil L4 that produces an output responsive to the magnetic coupling of the above-mentioned group d can be expressed equivalently by the following mathematical expression of a minus cosine function characteristic:

$$D(\theta) = P_0 - P \cos \theta$$

Because no inconvenience of description will be encountered even where P is omitted as considered to represent a value "1", P will be omitted in the following description.

Figure 3:
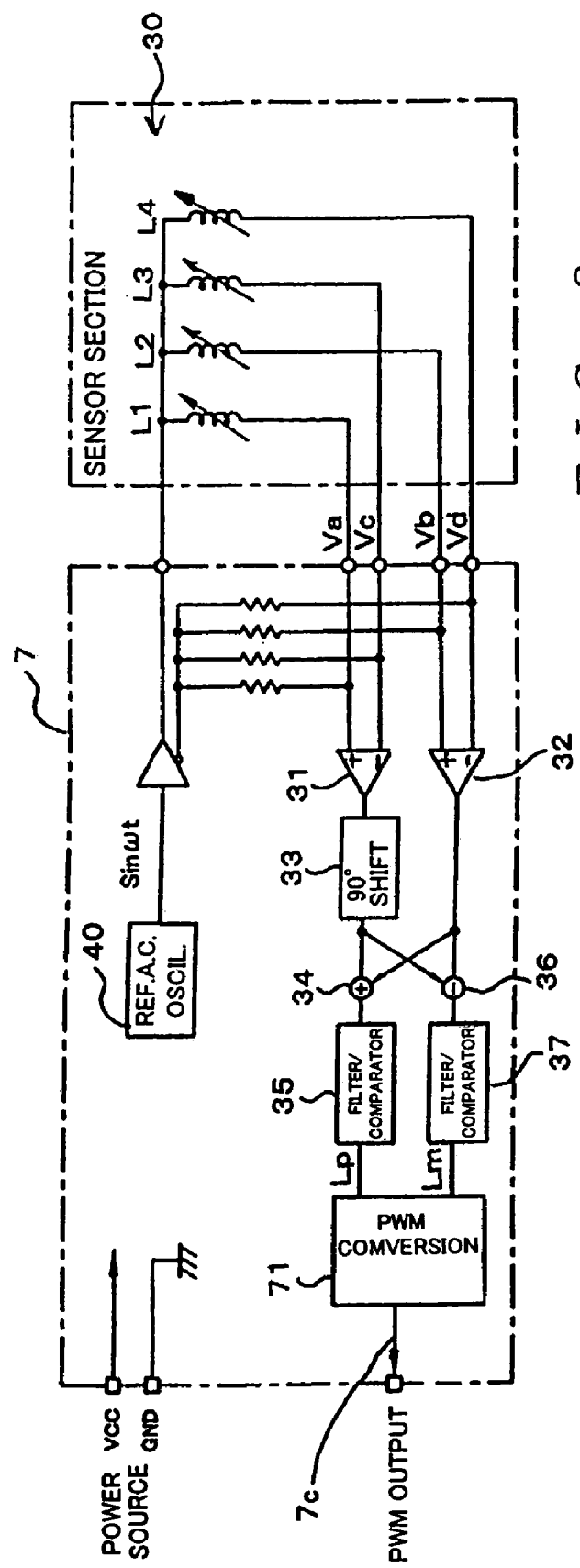
FIG. 3 is a diagram showing an example of electric circuitry related to a coil section in the relative-rotational-position detection apparatus (torque detection apparatus) of FIG. 1.

FIG. 3 shows an example of electric circuitry applicable to the relative-rotational-position detection apparatus (torque detection apparatus 4) of FIG. 1. In FIG. 3, each of the coils L1-L4 is shown equivalently as a variable inductance element. The coils L1-L4 are energized in a single phase by a predetermined high-frequency A.C. signal (for convenience sake, indicated by sin ωt) supplied from a reference A.C. signal source 40. As indicated below, voltages Va, Vb, Vc and Vd that are produced in the coils L1-L4, respectively, present intensity corresponding to the impedance values of the individual magnetic teeth groups a-d.

$Va = (P_0 + \sin \theta) \sin \omega t$ $Vb = (P_0 + \cos \theta) \sin \omega t$ $Vc = (P_0 - \sin \theta) \sin \omega t$ $Vd = (P_0 - \cos \theta) \sin \omega t$ Analog arithmetic operator 31 calculates a difference between the output voltage Va of the coil L1 corresponding to the sine phase and the output voltage Vc of the coil L3 corresponding to the minus sine phase varying differentially relative to the output voltage Va and thereby generates an output A.C. signal having an amplitude coefficient of a sine function characteristic of the angular variable θ, as expressed below.

$$Va - Vc = (P_0 + \sin\theta)\sin\omega t - (P_0 - \sin\theta)\sin\omega t = 2\sin\theta\sin\omega t$$

Analog arithmetic operator 32 calculates a difference between the output voltage Vb of the coil L2 corresponding to the cosine phase and the output voltage Vd of the coil L4 corresponding to the minus cosine phase varying differentially relative to the output voltage Vb and thereby generates an output A.C. signal having an amplitude coefficient of a cosine function characteristic of the angular variable θ, as expressed below.

$$Vb - Vd = (P_0 + \cos\theta)\sin\omega t - (P_0 - \cos\theta)\sin\omega t = 2\cos\theta\sin\omega t$$

In this way, there can be obtained two output A.C. signals "2 sin θ sin ωt" and "2 cos θ sin ωt" having been modulated in amplitude with two cyclic amplitude functions (sin θ and cos θ), respectively, that contain the angular variable θ correlating to a relative rotational position to be detected; hereinafter, the coefficient "2" will be omitted for simplicity. The thus-obtained output A.C. signals are similar to a sine-phase output signal "sin θ sin ωt" and cosine-phase output signal "cos θ sin ωt" produced by a conventional detector commonly known as a resolver. Note that the designations "sine-phase" and "cosine-phase" and the representations of the amplitude functions "sine" and "cosine" of the two output A.C. signals are just for illustrative purposes and the "sine" and "cosine" may be replaced with "cosine" and "sine", respectively, as necessary; namely, it is only necessary that one of the amplitude functions be "sine" and the other amplitude function be "cosine". In other words, the output signals of the arithmetic operators 31 and 32 may alternatively be expressed as "Va−Vc=cos θ sin ωt" and "Vb−Vd=sin θ sin ωt", respectively.

FIG. 2(*d*) is a graph of the amplitude coefficient or amplitude function (sin θ) of the sine function characteristic and amplitude coefficient or amplitude function (cos θ) of the cosine function characteristic of the output A.C. signals provided by the analog arithmetic operators 31 and 32 in the aforementioned manner. FIG. 2(*e*) is a graph schematically showing a manner in which a relative rotational position (i.e., torsion amount or torque of the torsion bar 3) is detected by measuring the phase θ (having a value in a range of about 90 degrees) on the basis of the individual output A.C. signals having amplitude functions as shown in FIG. 2(*d*).

Now, a description will be given about compensation of temperature drift characteristics. The impedance of the individual coils L1 to Ld varies in response to an ambient temperature, so that the output voltages Va to Vd of the coils L1-Ld also change in response to the ambient temperature. However, the output A.C. signals of sine and cosine function characteristics "sin θ sin ωt" and "cos θ sin ωt", obtained by arithmetically synthesizing the output voltages Va to Vd, can be prevented from being influenced by the coil impedance variation caused by the temperature drift, because temperature drift errors of the coils L1 to L4 are completely compensated for by the arithmetic operations of "Va−Vc" and "Vb−Vd". As a result, the instant embodiment permits high-accuracy detection. Further, temperature drift characteristics in other circuit portions, such as a reference A.C. signal oscillation circuit 40, are automatically compensated in a manner as described below.

In the instant embodiment, the relative rotational position is detected on the basis of the two output A.C. signals "sin θ sin ωt" and "cos θ sin ωt" produced by the arithmetic operators 31 and 32 using the phase detection scheme. As the phase detection scheme, there may be used the technique disclosed in Japanese Patent Application Laid-open Publication No. HEI-9-126809. For example, an A.C. signal sin θ cos ωt is generated by a shift circuit 33 shifting one of the output A.C. signals, sin θ sin ωt, by an electrical angle of 90 degrees. Then, additive synthesis is performed, via an analog adder 34, between the thus-generated A.C. signal sin θ cos ωt and the other output A.C. signal cos θ sin ωt, so as to generate an A.C. signal sin(ωt+θ) phase-shifted in a plus (or phase-advancing) direction in accordance with the angular variable θ (i.e., signal with the phase component θ converted to an A.C. phase shift amount). Then, a zero-cross point of the phase-advanced A.C. signal sin(ωt+θ) is detected by a filter/comparator 35, to generate a zero-cross detection pulse Lp.

In the meantime, subtractive synthesis is performed, via an analog subtracter 36, between the A.C. signal sin θ cos ωts output from the shift circuit 33 and the other output A.C. signal cos θ sin ωt, so as to generate an A.C. signal sin(ωt−θ) phase-shifted in a minus (or phase-retarding) direction in accordance with the angular variable θ (i.e., signal with the phase component θ converted to an A.C. phase shift amount). Then, a zero-cross point of the phase-retarded A.C. signal sin(ωt−θ) is detected by a filter/comparator 37, to generate a zero-cross detection pulse Lm.

The zero-cross detection pulse Lp of the phase-advanced A.C. signal, output from the comparator 35, is a time signal that indicates the phase shift amount θ of the phase-advanced A.C. signal sin(ωt+θ), i.e. relative rotational position between the input shaft 1 and the output shaft 2, as an advanced time position from a zero-phase time point of the reference A.C. signal sin ωt.

The zero-cross detection pulse Lm of the phase-retarded A.C. signal, output from the comparator 37, is a time signal that indicates the phase shift amount θ of the phase-retarded A.C. signal sin(ωt−θ), i.e. relative rotational position between the input shaft 1 and the output shaft 2, as a retarded time position from the zero-phase time point of the reference A.C. signal sin ωt.

Namely, each of the zero-cross detection pulse Lp of the phase-advanced A.C. signal and zero-cross detection pulse Lm of the phase-retarded A.C. signal is detection data indicating, by a time position, a phase shift amount θ corresponding to a relative rotational position between the input shaft 1 and the output shaft 2. Therefore, in principle, it is only necessary to output, as a detection signal of the relative rotational position, either the zero-cross detection pulse Lp of the phase-advanced A.C. signal or zero-cross detection pulse Lm of the phase-retarded A.C. signal. However, in order to provide detection data having a temperature drift duly compensated for, it is preferable to use both of the zero-cross detection pulses Lp and Lm. Thus, a circuit unit 7 further includes a PWM conversion circuit 71 for forming a variable pulse width signal PWM having a pulse width corresponding to a time difference Δt between the zero-cross detection pulse Lp of the phase-advanced A.C. signal and the zero-cross detection pulse Lm of the phase-retarded A.C. signal. The variable pulse width signal PWM having the pulse width corresponding to the time difference Δt, formed by the PWM conversion circuit 71, is output via a single output line 7c.

Figure 4:
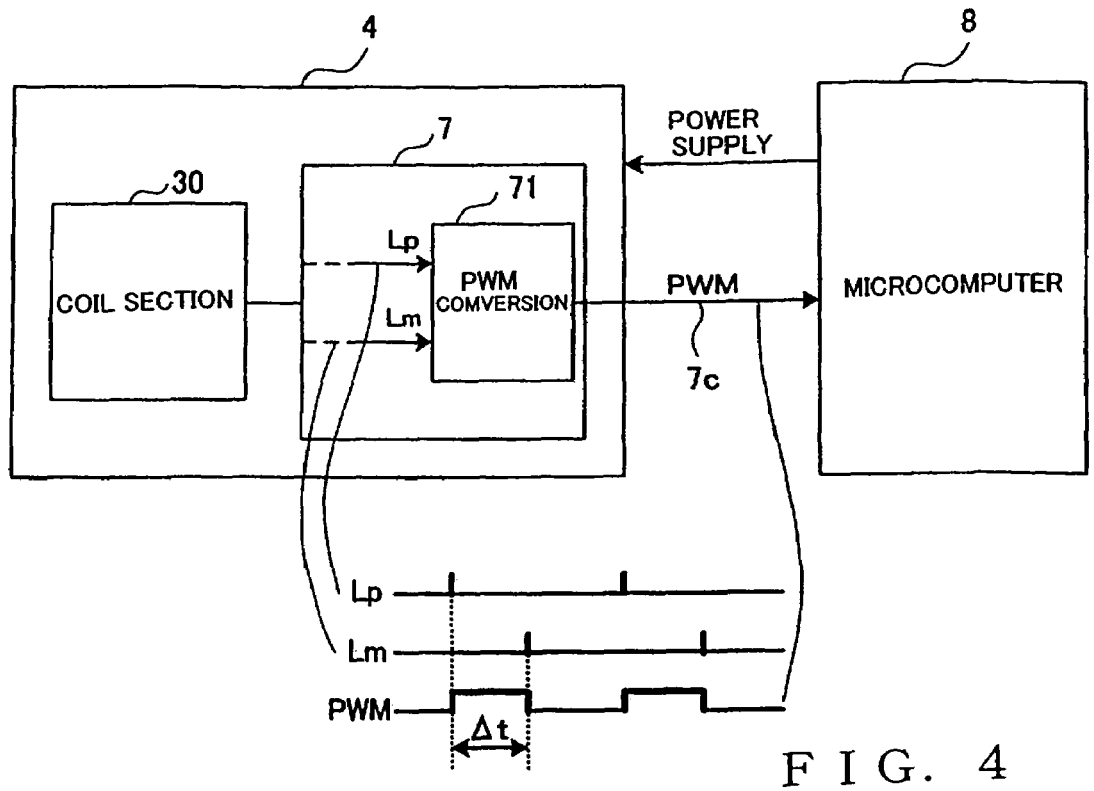
FIG. 4 is a block diagram showing an example general setup of a detection system where an output from the relative rotational position detection apparatus is coupled to a microcomputer.

Various circuits 31-37, 40 and 71 shown in FIG. 3 are assembled together as the circuit unit 7 on a single circuit board. Then, the circuit unit 7 is placed in a sensor case 41 integrally with sensor sections (i.e., first and second magnetic body sections 10 and 20 and coil section 30) of the detection apparatus 4, as illustrated in FIG. 1. In this way, the sensor sections (10, 20 and 30) of the detection apparatus 4 and the circuit unit 7 are housed compactly. FIG. 4 shows an example general setup of a system where the embodiment of the detection apparatus 4 of FIGS. 1 and 3 housed in the sensor case 41 is connected to a microcomputer 8 that uses detection outputs from the detection apparatus 4. The microcomputer 8 and the embodiment of the detection apparatus 4 of FIG. 3 may be interconnected only via at least a power supply line and the above-mentioned single output line 7c. The microcomputer 8 includes an input port for capturing a PWM signal, and the above-mentioned output line 7c is connected to the input port. The microcomputer 8 counts a pulse time width Δt of the PWM signal from the output line 7c connected to the input port, to thereby digitally measure a relative rotational position between the input shaft 1 and the output shaft 2. The thus-measured relative rotational position data is used as torsion angle detection data of the torsion bar 3 for power steering control purposes. The instant example circuit construction requires only one output line 7c and thus can be significantly simplified.

The microcomputer 8 only has to count the pulse time width Δt of the PWM signal from the output line 7c (i.e., time difference Δt between the pulses Lp and Lm), and it is not necessary for the microcomputer 8 to know zero-phase time points of the reference A.C. signal sin ωt used in the detection apparatus. As a consequence, processing and structure for measuring the time in the computer side can be simplified. The detection apparatus only has to generate the reference A.C. signal sin ωt inside the apparatus by means of an analog oscillation circuit or the reference A.C. signal oscillation circuit 40 comprising a sine wave function generator or the like. The detection apparatus does not have to give the microcomputer 8 the reference A.C. signal sin ωt as a synchronizing reference signal, in which regard too the construction of external terminals can be simplified.

The compensation of temperature drift characteristics will be further described. If, for example, the frequency and amplitude level of the AC signal generated by the reference A.C. signal oscillation circuit 40 or impedance in any other circuit component or signal path has varied due to the temperature drift characteristics, then the respective phase shift values θ in the zero-cross detection pulse Lp of the phase-advanced A.C. signal and zero-cross detection pulse Lm of the phase-retarded A.C. signal will include errors ε due to the temperature drift characteristics. Because the errors ε appear in both of the detection signals Lp and Lm in the same value and in the same direction (same sign), these errors ϵ will be automatically cancelled out in the time difference Δt between the two detection pulses Lp and Lm (time signals). Thus, the instant embodiment can perform high-accuracy detection of the relative rotational position without being influenced by the impedance variation in the circuit etc. due to a temperature drift.

Figure 6:
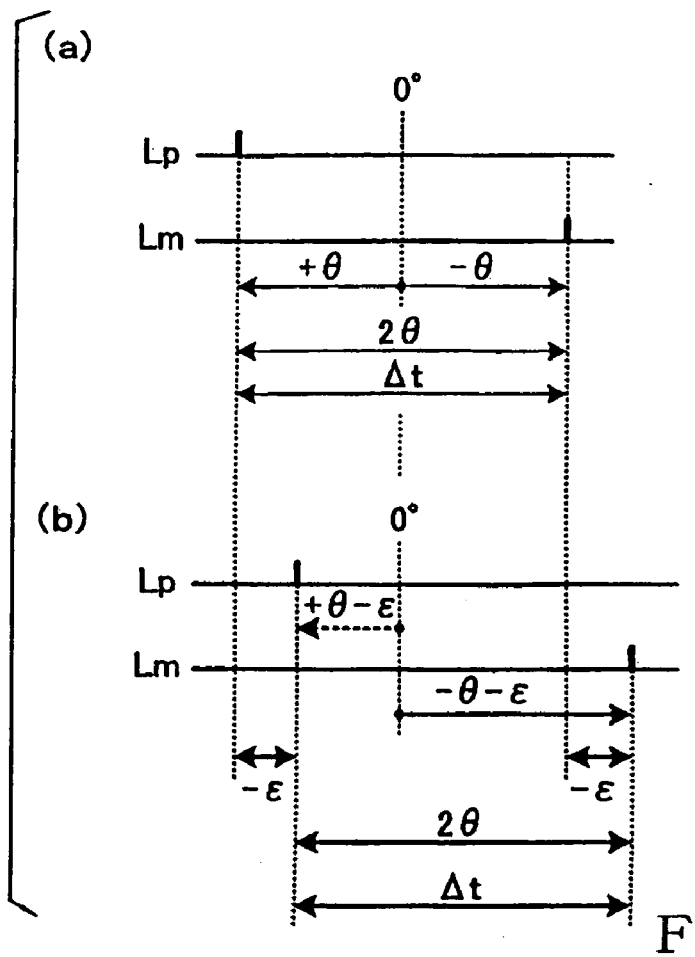
FIG. 6 is a timing chart schematically showing how temperature drift compensation of detection data is carried out by the detection circuit arrangements of FIG. 3.

FIG. 6 is a timing chart schematically showing how the temperature drift compensation is carried out. (a) shows example timing for generating the detection pulses Lp and Lm (time signals) in a case where there is no error ϵ caused by a temperature drift; in this instance, a time difference Δt is 2θ in theory and represents an accurate relative rotational position. (b) shows example timing for generating the detection pulses Lp and Lm (time signals) in a case where there are errors ϵ caused by a temperature drift. In this case, the detection pulse Lp of the phase-advanced A.C. signal is generated at timing earlier than the zero-phase time point by an advance time equal to "+θ−ϵ" including the error ϵ, while the detection pulse Lm of the phase-retarded A.C. signal is generated at timing later than the zero-phase time point by a retard time equal to "−θ−ϵ" including the error ϵ. However, even though the two detection pulses Lp and Lm (time signals) include the errors ϵ as noted above, the errors ϵ automatically cancel each other in the time difference Δt, so that the time difference Δt corresponds to the theoretical value 2θ indicative of an accurate relative rotational position. Thus, appropriate temperature drift compensation can be achieved.

Figure 5:
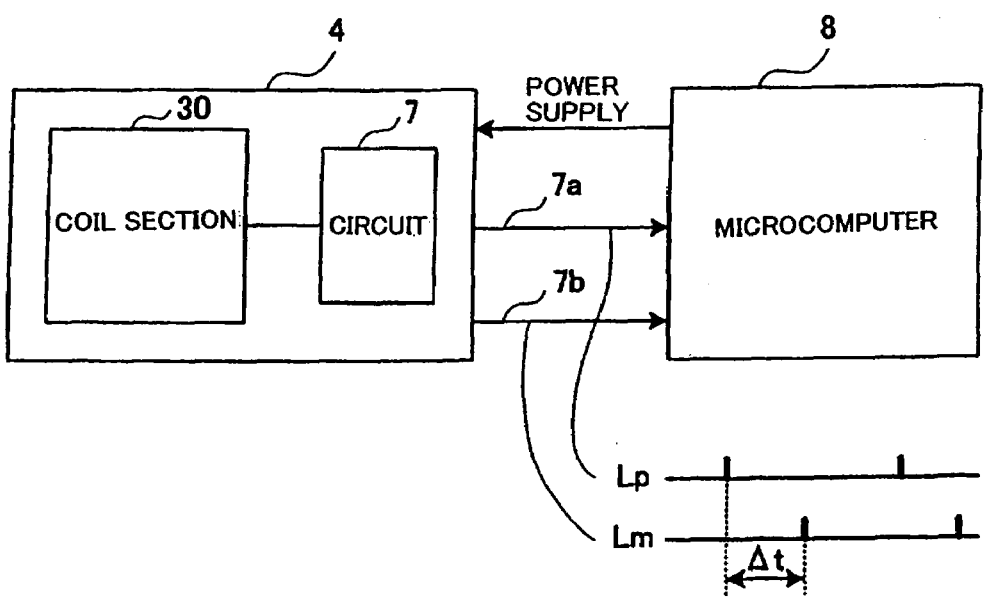
FIG. 5 is a block diagram showing another example general setup of the detection system where the output from the relative rotational position detection apparatus is coupled to the microcomputer.

FIG. 5 shows another example construction employed in the circuit unit 7. In the illustrated example of FIG. 5, the zero-cross detection pulse Lp of the phase-advanced signal and the zero-cross detection pulse Lm of the phase-retarded signal are output via two output lines 7a and 7b. The microcomputer 8 has a plurality of input ports for capturing time signals, and the above-mentioned output lines 7a and 7b are connected to the input ports, respectively. The microcomputer 8 counts a time difference Δt between the two time signals (pulses Lp and Lm), to thereby digitally measure a relative rotational position between the input shaft 1 and the output shaft 2. The microcomputer 8 counts a pulse time width Δt of the PWM signal from the output line 7c connected to the input port, to thereby digitally measure a relative rotational position between the input shaft 1 and the output shaft 2. The thus-measured relative rotational position data is used as torsion angle detection data for power steering control.

Figure 7:
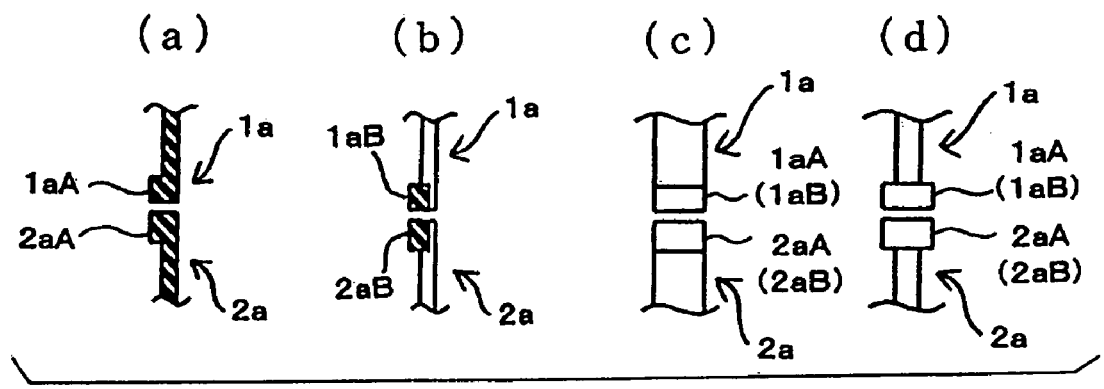
FIG. 7 is a schematic view showing specific construction of a distal end portion of each of the magnetic teeth of the first and second magnetic body sections.

FIG. 7 shows example arrangements for improving the magnetic response sensitivity of the variable magnetic coupling boundary sections formed between the magnetic teeth 1a-1d and 2a-2d of the individual groups a-d of the first and second magnetic body sections 10 and 20. More specifically, FIG. 7(a) is a side view showing an example where a distal end portion (i.e., end portion adjoining the airgap) 1aA or 2aA of each of the magnetic teeth 1a and 2a has a greater thickness than the remaining portion; with such arrangements, the magnetic response sensitivity can be improved as compared to a case where both the distal end portion and the remaining portion have the same thickness. FIG. 7(b) is a side view showing example arrangements where the distal end portion (i.e., end portion adjoining the airgap) 1aA or 2aA of each of the magnetic teeth 1a and 2a is formed of a magnetic substance while the remaining portion is formed of a nonmagnetic substance; with such arrangements, the magnetic response sensitivity can be improved as compared to a case where both the distal end portion and the remaining portion are formed of the same magnetic substance. Further, FIG. 7(c) is a plan view showing example arrangements where the distal end portion (i.e., end portion adjoining the airgap) 1aA, 2aA or 1aB, 2aB of each of the magnetic teeth 1a and 2a has the same horizontal width as the remaining portion. Furthermore, FIG. 7(d) is a plan view showing example arrangements where the distal end portion (i.e., end portion adjoining the airgap) 1aA, 2aA or 1aB, 2aB of each of the magnetic teeth 1a and 2a has a greater horizontal width than the remaining portion; such arrangements can enhance the magnetic response sensitivity as compared to the arrangements of FIG. 7(c).

FIG. 8 shows another embodiment of the present invention with arrangements simplified as compared to the embodiment in FIG. 1. FIG. 8(a) is a partly-sectional side view schematically showing the other embodiment of the detection apparatus 401. FIG. 8(b) is a schematic side view showing details of a first magnetic body section (input shaft rotor) 101 and second magnetic body section (output shaft rotor) 201. The first magnetic body section 101 comprises a cylindrical member having a plurality of magnetic teeth 1s, 1c, ... formed at unequal pitches along the circumferential direction thereof and corresponding to two groups s and c. Similarly, the second magnetic body section (output shaft rotor) 201 comprises a cylindrical member having a plurality of magnetic teeth 2s, 2c, ... formed at unequal pitches along the circumferential direction thereof and corresponding to two groups s and c. As in the above-described embodiment, each pair of the magnetic teeth 1s, 1c, ... of the first magnetic body section (input shaft rotor) 101 and the magnetic teeth 2s, 2c, ... of the second magnetic body section (output shaft rotor) 201, opposed to the magnetic teeth 1s, 1c, ... , have complementary lengths. Namely, if the length of the teeth of each of the two groups s and c is classified into any one of two different lengths, "1" and "2", for convenience of description and if the length of the magnetic tooth 1s of the group s in the first magnetic body section (input shaft rotor) 101 is "1", then the length of the magnetic tooth 2s, opposed thereto, of the group s in the second magnetic body section (output shaft rotor) 201 is set to "2". Regarding the group c, if the length of the magnetic tooth 1c is "2", then the length of the magnetic tooth 2c opposed thereto is set to "1".

In the embodiment of FIG. 8, a coil section 301 comprises a coil L1 wound around a variable magnetic coupling boundary section formed between the magnetic teeth 1s and 2s of the group s of the first and second magnetic body sections 101 and 201, and a coil L2 wound around a variable magnetic coupling boundary section formed between the magnetic teeth 1c and 2c of the group.

Namely, as compared to the embodiment of FIG. 1, the embodiment of FIG. 8 is simple in construction; that is, the embodiment of FIG. 8 is characterized by the simplified construction of the magnetic teeth 1s, 1c, ... , 2s, 2c, ... reduced number of (i.e., two) coils of the coil section 301.

As seen in expansion plan views of FIG. 9(a)-(c), the unequalness in arrangement (pitch) of the magnetic teeth 1s, 1c, ... and 2s, 2c, ... of the first and second magnetic body sections 101 and 201 has predetermined regularity such that, as in the above-described first embodiment, variation in magnetic coupling occurring in the individual boundary sections assumes predetermined phase relationship in correspondence with a relative rotational position between the input shaft 1 and the output shaft 2. Namely, as the correspondency between the magnetic teeth of the first and second magnetic body sections 101 and 201 varies in response to variation in the relative rotational position between the input shaft 1 and the output shaft 2, the phases of variation in magnetic coupling degree in the boundary sections corresponding to the groups s and c will differ as follows.

For example, FIG. 9(a) shows exemplary correspondency between the magnetic teeth 1s and 1c of the first magnetic body section 101 and the magnetic teeth 2s and 2c of the second magnetic body section 201 when the shift amount (i.e., relative rotational position), in the clockwise direction, of the input shaft 1 with respect to the output shaft 2 is the maximum (e.g., +7 degrees). FIG. 9(b) shows exemplary correspondency between the magnetic teeth 1s and 1c of the first magnetic body section 101 and the magnetic teeth 2s and 2c of the second magnetic body section 201 when the shift amount (i.e., relative rotational position) of the input shaft 1 with respect to the output shaft 2 is zero (representing the neutral position). Further, FIG. 9(c) shows exemplary correspondency between the magnetic teeth 1s and 1c of the first magnetic body section 101 and the magnetic teeth 2s and 2c of the second magnetic body section 201 when the shift amount (i.e., relative rotational position), in the counterclockwise direction, of the input shaft 1 with respect to the output shaft 2 is the maximum (e.g., −7 degrees).

For example, when, in the illustrated example of FIG. 9(a) corresponding to the maximum shift amount in the clockwise direction, the magnetic tooth 1s of the first magnetic body section 101 and the magnetic tooth 2s of the second magnetic body section 201, opposed to each other via a gap, exactly align (i.e., exactly overlap) with each other in each of the boundary sections formed by the magnetic teeth 1s and 2s, belonging to the group s, of the first and second magnetic body sections 101 and 201, the magnetic coupling degree in that boundary section presents the maximum value, which may be regarded as corresponding to a value of sin 90° if converted, for example, into a sine function value. Further, when the magnetic tooth 1c of the first magnetic body section 101 and the magnetic tooth 2c of the second magnetic body section 201, opposed to each other via a gap, are shifted from (i.e., do not overlap with) each other in each of the boundary sections formed by the magnetic teeth 1c and 2c, belonging to the group c, of the first and second magnetic body sections 101 and 201 in the illustrated example of FIG. 9(a), the magnetic coupling degree in that boundary section presents the minimum value, which may be regarded as corresponding to a value of cos 90° if converted, for example, into a sine function value. Namely, the magnetic coupling variation in each of the boundary sections formed by the magnetic teeth 1s and 2s, belonging to the group s, of the first and second magnetic body sections 101 and 201 and the magnetic coupling variation in each of the boundary sections formed by the magnetic teeth 1c and 2c, belonging to the group c, of the first and second magnetic body sections 101 and 201 can be associated with relationship of sine and cosine shifted in phase from each other by 90 degrees.

In the illustrated example of FIG. 9(b) corresponding to the neutral position, the magnetic teeth 1s and 2s, belonging to the group s, of the first and second magnetic body sections 101 and 201 overlap with each other by an amount corresponding to about one half (½) of the horizontal tooth width, and the magnetic coupling degree in the boundary section corresponds to a value of sin 45° if converted into a sine function value. At that time, the magnetic teeth 1c and 2c, belonging to the group c, of the first and second magnetic body sections 101 and 201 overlap with each other by an amount corresponding to about one half (½) of the horizontal tooth width, and the magnetic coupling degree in the boundary section corresponds to a value of cos 45° if converted into a sine function value.

Further, in the illustrated example of FIG. 9(c) corresponding to the maximum shift in the counterclockwise direction, the magnetic teeth 1s and 2s, belonging to the group s, of the first and second magnetic body sections 101 and 201 are shifted (i.e., do not overlap with) from each other by an amount corresponding exactly to the horizontal tooth width, and the magnetic coupling degree in the boundary section corresponds to a value of sin 0° if converted into a sine function value. At that time, the magnetic teeth 1c and 2c, belonging to the group c, of the first and second magnetic body sections 101 and 201 exactly align or overlap with each other, and the magnetic coupling degree in the boundary section corresponds to a value of cos 0° if converted into a sine function value.

In this way, the relative rotational position (torsion amount of the torsion bar 3) over a range of about 14 degrees from the maximum counterclockwise shift amount (about −7 degrees) to the maximum clockwise shift amount clockwise direction (about +7 degrees) between the input shaft 1 and the output shaft 2 appears as magnetic coupling variation in a range of about 90 degrees, i.e. from sin 0° to sin 90° (or from cos 0° to cos 90°) in terms of the sine function value. Thus, by measuring the magnetic coupling variation by means of the coil section 301, it is possible to detect the relative rotational position (torsion amount of the torsion bar 3).

The individual coils L1 and L2 of the coil section 301 are energized by a common reference A.C. signal (e.g., sin ωt). As the magnetic coupling in each of the boundary sections of the groups s and c of the first and second magnetic body sections 101 and 201 varies in response to variation in the relative rotational position between the input shaft 1 and the output shaft 2, impedance of the coils L1 and L2 corresponding to the boundary sections (namely, groups s and c) varies. In the illustrated example of FIG. 9, the impedance variation can be expressed by a range of about 90 degrees if converted into a sine function value as regards the relative rotational position (torsion amount of the torsion bar 3) in the range of about 14 degrees. Thus, detecting a phase value θ of the sine function value, indicative of the impedance variation corresponding to the relative rotational position (torsion amount of the torsion bar 3), can make absolute detection of the relative rotational position, i.e. torsion amount.

The impedance variation can be expressed as follows, using an angular variable θ in the angular range of about 90 degrees. Impedance variation A(θ) of an ideal sine function characteristic occurring in the coil L1 that produces an output responsive to the magnetic coupling in the boundary section of the group s can be expressed equivalently by the following mathematical expression:

$A(\theta) = P_0 + P \sin \theta$

Further, ideal impedance variation B(θ) occurring in the coil L2 that produces an output responsive to the magnetic coupling in the boundary section of the group c can be expressed equivalently by the following mathematical expression of a cosine function characteristic:

$B(\theta) = P_0 + P \cos \theta$

For the reason as noted earlier, P will hereinafter be omitted.

Figure 10:
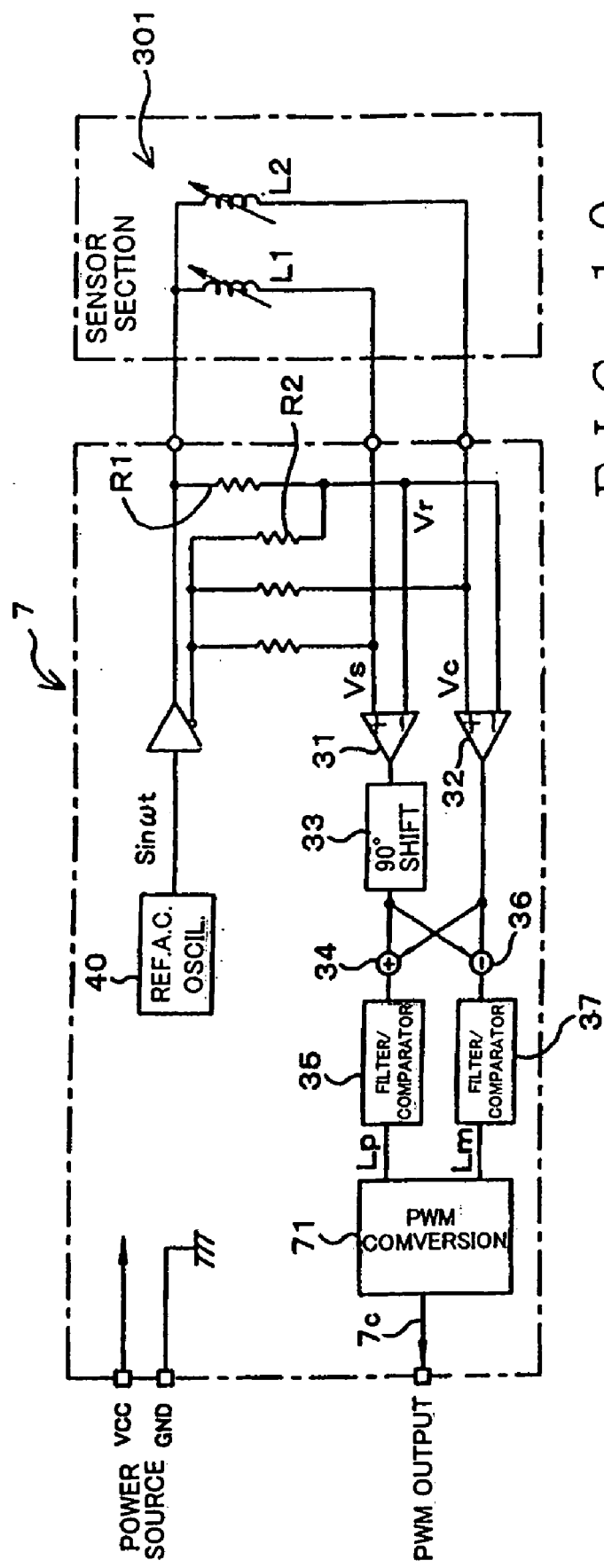
FIG. 10 is a diagram showing an example of electric circuitry related to a coil section in the relative-rotational-position detection apparatus (torque detection apparatus) of FIG. 8.

FIG. 10 shows an example of electric circuitry applicable to the relative-rotational-position detection apparatus (torque detection apparatus 401) of FIG. 8. In FIG. 8, each of the coils L1 and L2 is shown equivalently as a variable inductance element. The coils L1 and L2 are energized in a single phase by a predetermined high-frequency A.C. signal (sin ωt) supplied from a reference A.C. signal source 40. As indicated below, voltages Va and Vc that are produced in the coils L1 and L2, respectively, present intensity corresponding to the impedance values of the individual groups s and c.

$$Vs = (P_0 + \sin\theta)\sin\omega t$$

$$Vc = (P_0 + \cos\theta)\sin\omega t$$

The circuitry of FIG. 10 includes voltage-dividing resistors R1 and R2 for producing a predetermined reference A.C. voltage Vr. Analog arithmetic operator 31 subtracts the reference A.C. voltage Vr from the output voltage Va of the coil L1 corresponding to the sine phase and thereby generates an output A.C. signal having an amplitude coefficient of a sine function characteristic of an angular variable θ, as expressed below.

$$Vs - Vr = (P_0 + \sin\theta)\sin\omega t - Vr = \sin\theta\sin\omega t$$

Analog arithmetic operator 32 subtracts the reference A.C. voltage Vr from the output voltage Vc of the coil L2 corresponding to the cosine phase and thereby generates an output A.C. signal having an amplitude coefficient of a cosine function characteristic of an angular variable θ, as expressed below.

$$Vc - Vr = (P_0 + \cos\theta)\sin\omega t - Vr = \cos\theta\sin\omega t$$

Figure 9:
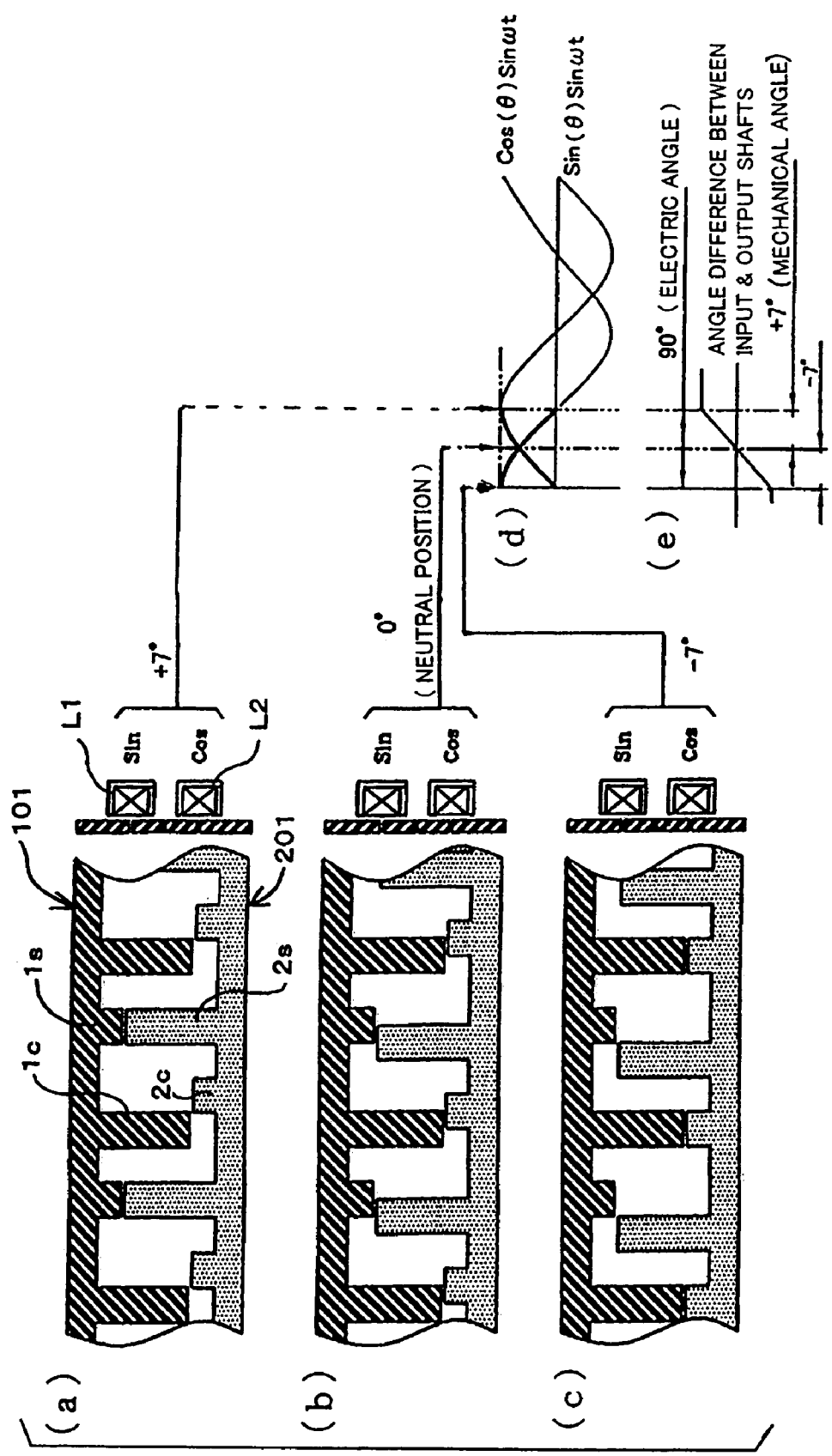
FIG. 9 is an expansion plan view showing construction of magnetic teeth of the first and second magnetic body sections and positional arrangement of corresponding coils in the embodiment of FIG. 8.

Thus, in the embodiment of FIGS. 8-10, too, there can be obtained two output A.C. signals "sin θ sin ωt" and "cos θ sin ωt" having been modulated in amplitude with two cyclic amplitude functions (sin θ and cos θ), respectively, that contain the angular variable θ correlating to a relative rotational position to be detected. FIG. 9(d) is a graph which, similarly to FIG. 2(d), shows the amplitude coefficient or amplitude function (sin θ) of the sine function characteristic and amplitude coefficient or amplitude function (cos θ) of the cosine function characteristic of the output A.C. signals provided by the analog arithmetic operators 31 and 32 in the aforementioned manner. Further, FIG. 9(e) is a graph which, similarly to FIG. 2(e), schematically shows a manner in which a relative rotational position (i.e., torsion amount or torque of the torsion bar 3) is detected by measuring a phase θ (having a value in a range of about 90 degrees) on the basis of the individual output A.C. signals having amplitude functions as shown in FIG. 9(d). Other circuits in FIG. 10 are similar to those shown in FIG. 3, and they generate detection pulses Lp and Lm of phase-advanced and phase-retarded signals indicating a phase angle θ correlating to a relative rotational position to be detected and also generate a variable pulse width signal PWM having a pulse width corresponding to a time difference Δt between the detection pulses Lp and Lm. Means for generating the reference A.C. voltage Vr is not limited to the one based on the voltage-dividing resistors R1 and R2, and the reference A.C. voltage Vr may be generated via a coil of constant impedance (i.e., coil whose impedance does not vary in accordance with the phase θ and which is of course energized by an A.C. voltage, sin ωt). Namely, the voltage-dividing resistor R1 may be replaced with a constant-voltage generating coil.

Figure 11:
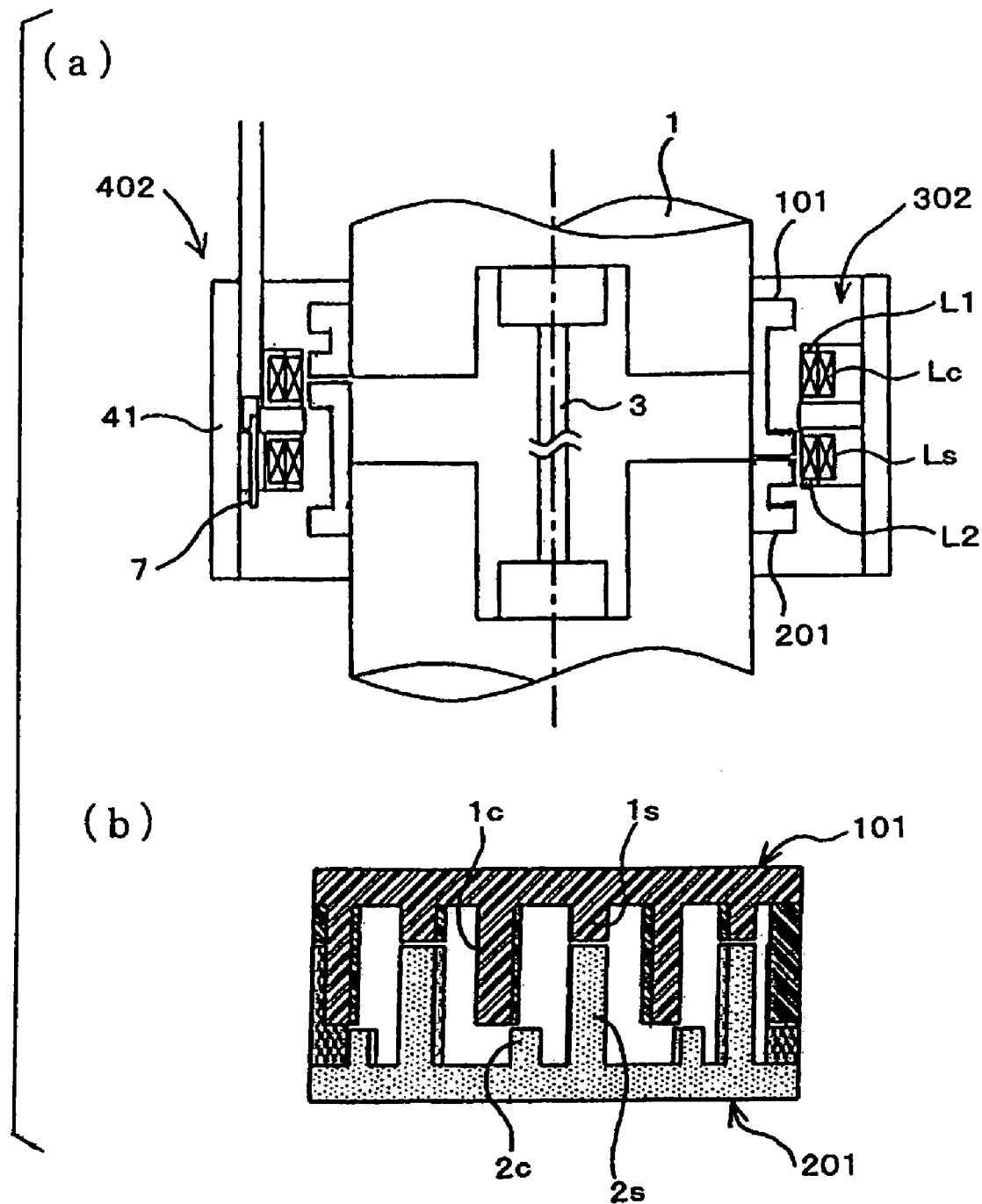
FIG. 11 is a schematic sectional side view showing still another embodiment of the relative rotational position detection apparatus in accordance with the first aspect of the present invention, and a schematic side view extractively showing first and second magnetic body sections in the still other embodiment.
Figure 12:
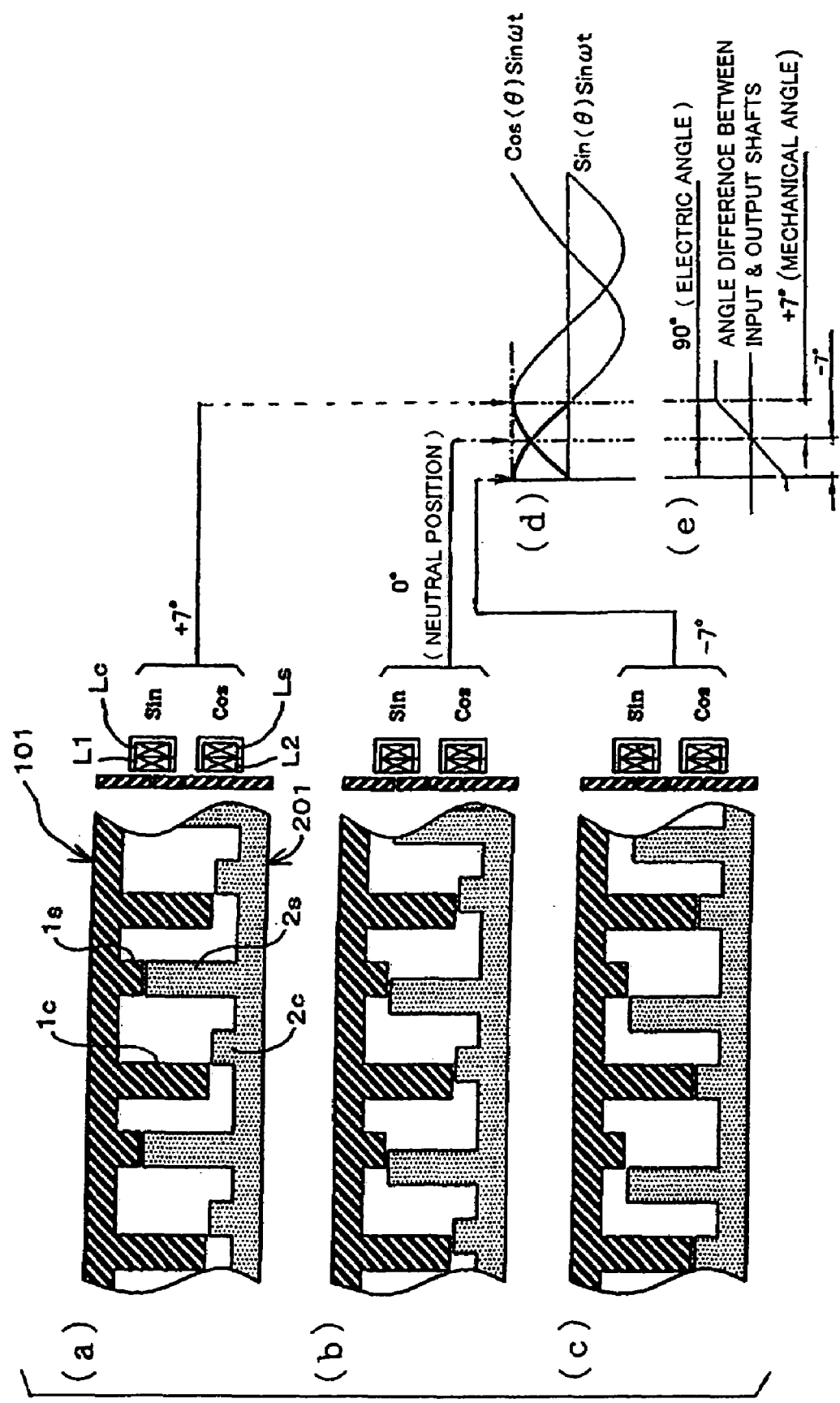
FIG. 12 is an expansion plan view showing construction of magnetic teeth of the first and second magnetic body sections and positional arrangement of corresponding coils in the embodiment of FIG. 11.
Figure 13:
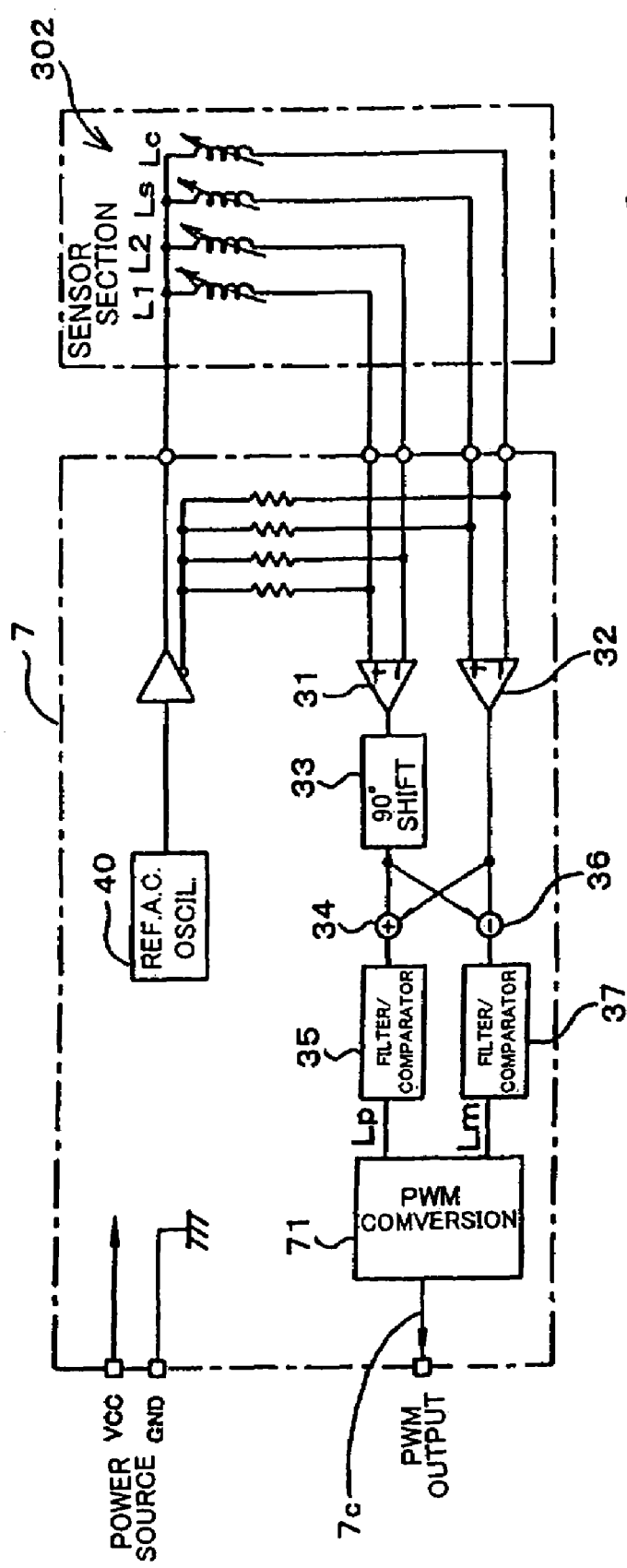
FIG. 13 is a diagram showing an example of electric circuitry related to a coil section in the relative-rotational-position detection apparatus (torque detection apparatus) of FIG. 11.

FIGS. 11-13 show a modification of the embodiment of FIGS. 8-10. The modified embodiment of FIGS. 11-13 is different in construction from the embodiment of FIGS. 8-10 in that a coil section 302 includes two sets of coils L1, Ls and L2, Lc in corresponding relation to variable magnetic coupling boundary sections of groups s and c; in other respects, the modified embodiment of FIGS. 11-13 is similar in construction to the embodiment of FIGS. 8-10. Namely, two coils L1 and Lc are wound in correspondence with the boundary section of the group s, while two coils L2 and Ls are wound in correspondence with the boundary section of the group c. More specifically, main coils L1 and L2 corresponding to the groups s and c are wound for the boundary sections of the groups s and c, and sub-coils Lc and Ls corresponding to the other groups c and s are wound on the outer periphery of the main coils L1 and L2, respectively.

More specifically, for the group s, the coils L1 and Ls are wound in a pair, and respective numbers of turns (i.e., respective inductance) of the coils L1 and Ls are set such that impedance variation thereof presents a sine function characteristic in a range of about 90 degrees in correspondence with a maximum moving range shown in FIG. 12(a)-(c). For the group c, the coils L2 and Lc are wound in a pair, and respective numbers of turns (i.e., respective inductance) of the coils L2 and Lc are set such that impedance variation thereof presents a cosine function characteristic over a range of about 90 degrees in correspondence with the maximum moving range shown in FIG. 12(a)-(c). The numbers of turns (i.e., inductance) of the main coils L1 and L2 are equal to each other (L1=L2), and so are the numbers of turns (i.e., respective inductance) of the sub-coils Ls and Lc (Ls=Lc); however, the main coils L1 and L2 and the sub-coils Ls and Lc are different from each other in number of turns (i.e., inductance).

For example, in the illustrated example of FIG. 12(a) corresponding to the maximum shift amount in the clockwise direction (e.g., +7 degrees) of the input shaft 1 relative to the output shaft 2 as in the illustrated example of FIG. 9(a), the magnetic tooth 1s of the first magnetic body section 101 and the magnetic tooth 2s of the second magnetic body section 201, opposed to each other via a gap, exactly align (i.e., exactly overlap) with each other in each of the boundary sections formed by the magnetic teeth 1s and 2s, belonging to the group s, of the first and second magnetic body sections 101 and 201, and the magnetic coupling degree in that boundary section presents the maximum value, which may be regarded as corresponding to a value of sin 90° if converted, for example, into a sine function value. Thus, the number of turns N of the main coil L1 is set such that the impedance of the corresponding main coil L1 takes a value corresponding to sin 90° (e.g., "2a+b"). At that time, the magnetic teeth 1c and 2c, belonging to the group c, of the first and second magnetic body sections 101 and 201 in the illustrated example of FIG. 12(a) are shifted from each other by an amount corresponding exactly to the horizontal tooth width (namely do not at all overlap with each other), and the magnetic coupling degree in the boundary section presents the minimum value. Thus, the number of turns N of the main coil L2 is set such that the impedance of the corresponding main coil L2 takes a value corresponding to cos 90° (e.g., "a+b"). On the other hand, the number of turns n of the sub-coil Ls of the group s, provided in association with the boundary section formed by the magnetic teeth 1c and 2c of the group c, is set such that the impedance of the sub-coil Ls takes a value corresponding to −sin 90° (e.g., "b") when the magnetic coupling degree is of the minimum value. Similarly, the number of turns n of the sub-coil Lc of the group c, provided in association with the boundary section formed by the magnetic teeth 1s and 2s of the group s, is set such that the impedance of the sub-coil Lc takes a value corresponding to −cos 90° (e.g., "a+b") when the magnetic coupling degree is of the maximum value.

In brief, the numbers of turns N of the main coils L1 and L2 are each set such that the impedance takes the value "2a+b" (corresponding to sin 90=cos 0°) when the magnetic coupling degree is the maximum and takes the value "a+b" (corresponding to cos 90°=sin 0°) when the magnetic coupling degree is the minimum. The numbers of turns n of the sub-coils Ls and Lc are each set such that the impedance takes the value "a+b" (corresponding to −cos 90°=−sin 0°) when the magnetic coupling degree is the maximum and takes the value "b" (corresponding to −sin 90°=−cos 0°) when the magnetic coupling degree is the minimum.

The impedance variation can be expressed as follows, using an angular variable θ in the angular range of about 90 degrees, from 0 to 90 degrees. Impedance variation A(θ) of an ideal sine function characteristic occurring in the coil L1 that produces an output responsive to the magnetic coupling in the boundary section of the group s can be expressed equivalently, similarly to the aforementioned, by the following mathematical expression:

$$A(\theta)=P_0+P\sin\theta$$

Further, impedance variation B(θ) of an ideal cosine function characteristic occurring in the coil L2 that produces an output responsive to the magnetic coupling in the boundary of the group c can be expressed equivalently by the following mathematical expression:

$$B(\theta)=P_0+P\cos\theta$$

Furthermore, impedance variation C(θ) of an ideal sine function characteristic occurring in the coil Ls that produces an output responsive to the magnetic coupling in the boundary of the group s can be expressed equivalently by the following mathematical expression:

$$C(\theta)=P_0-P\sin\theta$$

Furthermore, impedance variation D(θ) of an ideal cosine function characteristic occurring in the coil Lc that produces an output responsive to the magnetic coupling in the boundary section of the group c can be expressed equivalently by the following mathematical expression:

$$D(\theta)=P_0-P\cos\theta,$$

wherein it may be considered that $P_0$ corresponds to the above-mentioned value "a+b" and P corresponds to the above-mentioned value "b".

FIG. 13 shows an example of electric circuitry applicable to the relative-rotational-position detection apparatus (torque detection apparatus 402) of FIG. 11, which is substantially similar in construction to the electric circuitry of FIG. 3. In the illustrated example of FIG. 13, the coils L3 and L4 are replaced with the sub-coils Ls and Lc; however, because both the coils L3 and L4 and the sub-coils Ls and Lc theoretically present impedance variation C(θ) and D(θ) of similar characteristics, the explanation made above in relation to FIG. 3 also applies to FIG. 13 as-is. Thus, in the embodiment of FIGS. 11-13, too, there can be obtained two output A.C. signals "sin θ sin ωt" and "cos θ sin ωt" having been modulated in amplitude with two cyclic amplitude functions (sin θ and cos θ), respectively, that contain the angular variable θ correlating to a relative rotational position to be detected. On the basis of the thus-obtained output signals, there are generated detection pulses Lp and Lm of phase-advanced and phase-retarded signals indicating a phase angle θ correlating to a relative rotational position to be detected, as well as a variable pulse width signal PWM having a pulse width corresponding to a time difference Δt between the detection pulses Lp and Lm.

Figure 14:
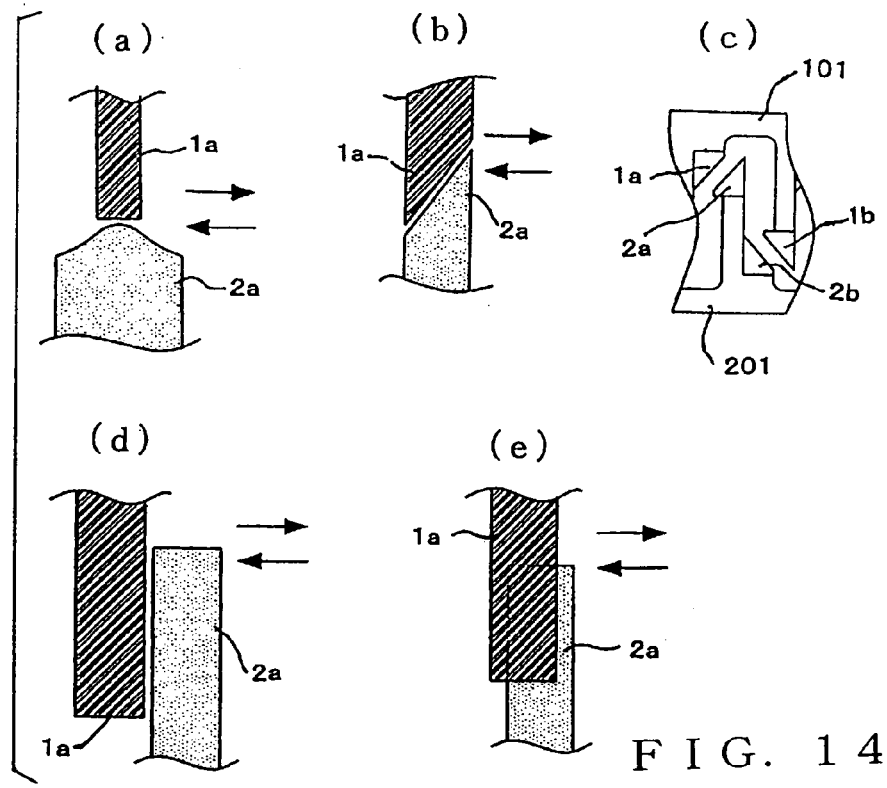
FIG. 14 is a schematic view showing example specific construction of the magnetic teeth of the first and second magnetic body sections with various improvements and devices applied thereto.

Needless to say, improvements and devices applied to the magnetic teeth of the first and second magnetic body sections (input shaft rotor and output shaft rotor) 10 and 20 shown in FIG. 7 are also applicable to the other embodiments (FIGS. 8 and 11). Further, any of various forms of magnetic-teeth opposing arrangement may be employed, as illustratively shown in FIG. 14, to form the variable magnetic coupling boundaries with the magnetic teeth of the first and second magnetic body sections (input shaft rotor and output shaft rotor) 10, 20 or 101, 201 in each of the above-described embodiments (FIGS. 1, 8 and 11).

In the illustrated example of FIG. 14(a), the distal end of one of the opposed magnetic teeth 1a has a flat surface, while the distal end of the other magnetic tooth 2a has a curved surface, such as a sine curve surface. Thus, there can be readily obtained a variation curve close to a sine curve (or cosine curve), as variation of magnetic coupling degree (i.e., impedance variation) obtainable as the two magnetic teeth 1a and 2a are displaced relative to each other in the horizontal or leftward/rightward direction of the figure.

In the illustrated example of FIG. 14(b), the distal ends of the opposed magnetic teeth 1a and 2a are shaped obliquely, and these oblique surfaces are opposed to each other. In this case, as the two magnetic teeth 1a and 2a are displaced relative to each other in the leftward/rightward direction of the figure, the gap or distance between the opposed oblique distal end surfaces varies, so that there can be obtained variation of magnetic coupling degree (i.e., impedance variation). With the oblique profiles, it is possible to increase the area of the distal end surfaces opposed to each other via the gap, to thereby increase the magnetic flux amount and enhance the magnetic response sensitivity. In this case, the magnetic teeth 1a, 2a and the magnetic teeth 1b, 2b of the first and second magnetic body sections (input shaft rotor and output shaft rotor) 101 and 201 are inclined in opposite directions.

In the illustrated example of FIG. 14(d), the magnetic teeth 1a and 2a are opposed to each other at their side surfaces via a gap without their flat distal end surfaces overlapping each other. In this case, as the two magnetic teeth 1a and 2a are displaced relative to each other in the leftward/rightward direction of the figure, the gap or distance between the opposed side surfaces varies, so that there can be obtained variation of magnetic coupling degree (i.e., impedance variation). If the thickness between the opposite side surfaces of each of the two magnetic teeth 1a and 2a is increased, the distal end surfaces opposed to each other via the gap can have an increased area, so that the magnetic flux amount can be increased to thereby enhance the magnetic response sensitivity.

In the illustrated example of FIG. 14(e), the opposed magnetic teeth 1a and 2a have their respective flat surfaces overlapping each other via a predetermined gap or distance. In this case, as the two magnetic teeth 1a and 2a are displaced relative to each other in the leftward/rightward direction, the area of the overlappingly-opposed flat surfaces increases, so that there can be obtained variation of the magnetic coupling degree (impedance variation). The increased overlapping area can increase the magnetic flux amount and enhance the magnetic response sensitivity.

The following paragraphs describe embodiments of a relative rotational position detection apparatus in accordance with a second aspect of the present invention, with reference to FIGS. 15-20.

Figure 15:
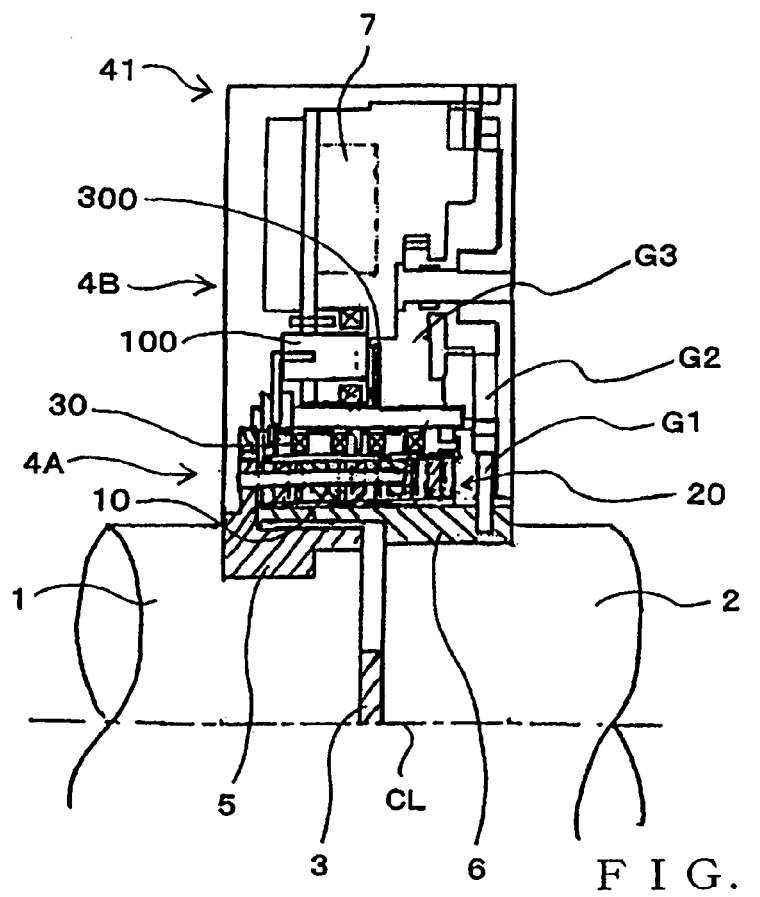
FIG. 15 is a schematic sectional side view showing an embodiment of a relative rotational position detection apparatus in accordance with a second aspect of the present invention.

FIG. 15 is a schematic sectional side view showing an embodiment of the relative rotational position detection apparatus in accordance with the second aspect of the present invention. In FIG. 15, there is shown a novel detection system which includes, in relation to steering of a motor cycle, detection apparatus of two different functions, i.e. a torque detection apparatus 4A having a function for detecting torsional torque acting on a torsion bar of a steering shaft and a steering angle detection apparatus 4B having a function as a steering angle (steering shaft rotation) sensor; these detection apparatus are integrally accommodated in a cylindrical external case 41. Of these torque detection apparatus, the embodiment of the relative rotational position detection apparatus of the present invention is the torque detection apparatus 4A. Although only an upper half of the side sectional surface is illustrated in FIG. 15, the remaining, lower half, which is vertically symmetrical to the illustrated upper half about an axial centerline, appears in a lower end region of FIG. 15. However, the steering angle detection apparatus 4B, which comprises a plurality of gears G1-G3, stator section 100, rotor section 200, etc., only has to be provided in at least one position. Of course, the torque detection apparatus 4A and the steering angle detection apparatus 4B may be provided separately rather than integrally within the external case 41. In practicing the present invention as the relative rotational position detection apparatus (torque detection apparatus 4A), the provision of the steering angle detection apparatus 4B is not necessarily essential.

The relative rotational position detection (torque detection apparatus 4A) of FIG. 15 comprises a first magnetic body section 10 provided to rotate in interlocked relation to rotation of the input shaft 1, a second magnetic body section 20 provided to rotate in interlocked relation to rotation of the output shaft 2, and a coil section 30. Mounting ring 5 is attached to the input shaft 1, and the first magnetic body section 10 is mounted on the mounting ring 5. Further, a mounting ring 6 is attached to the output shaft 2, and the second magnetic body section 20 is mounted on the mounting ring 6.

Figure 16:
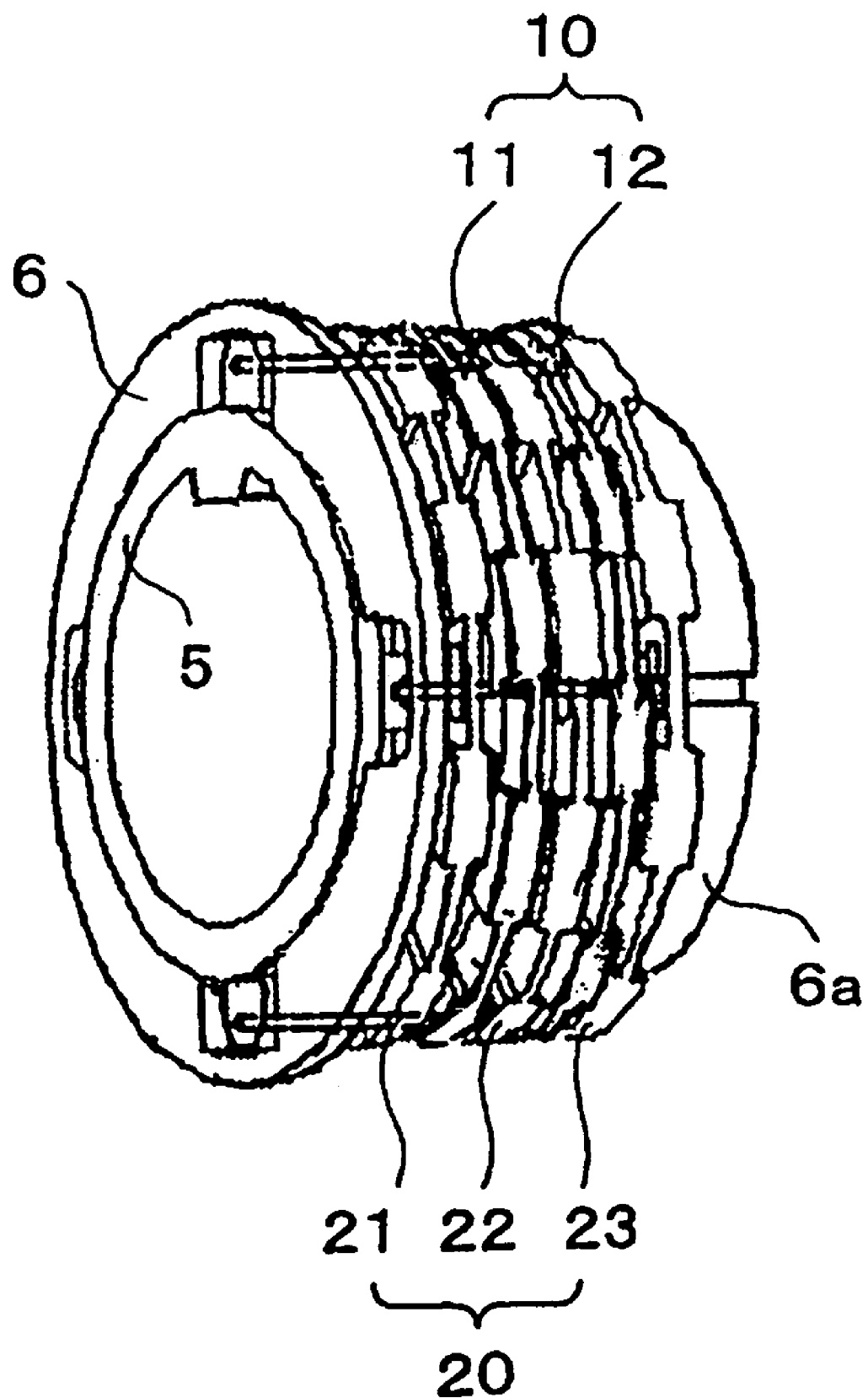
FIG. 16 is an assembled perspective view extractively showing assembled first and second magnetic body sections in the relative rotational position detection apparatus of FIG. 15.
Figure 17:
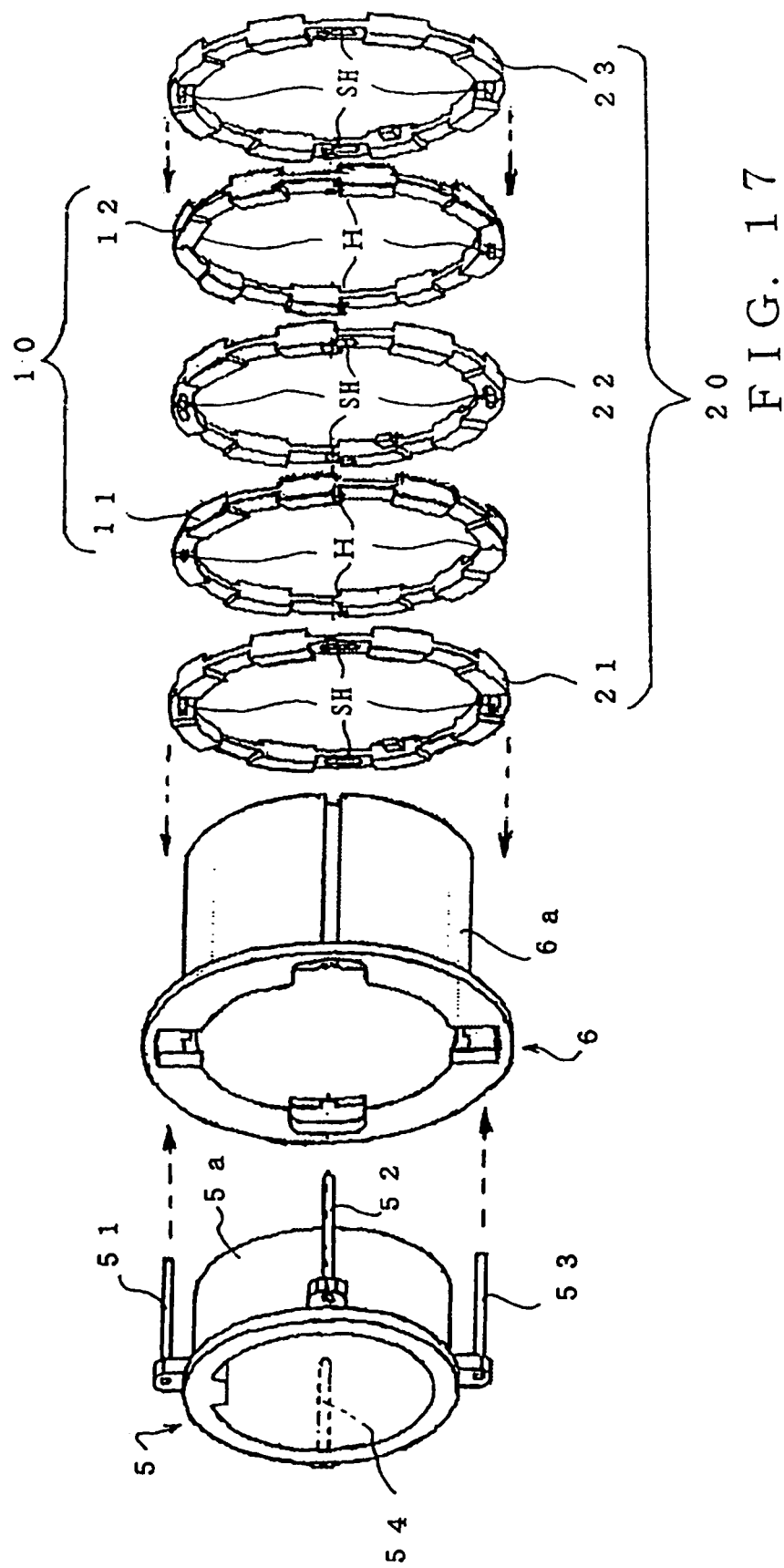
FIG. 17 is an exploded perspective view corresponding to FIG. 16.

FIG. 16 is an assembled perspective view extractively showing the first and second magnetic body sections 10 and 20 mounted on the mounting rings 5 and 6. FIG. 17 is an exploded perspective view corresponding to FIG. 16.

The first magnetic body section 10 comprises a plurality of (two in the illustrated example) first magnetic rings 11 and 12 axially spaced apart from each other. The second magnetic body section 20 comprises a plurality of (three in the illustrated example) third magnetic rings 21, 22 and 23 axially spaced apart from each other. The magnetic rings 11 and 12 are inserted in a sleeve portion 6a of one of the mounting rings 6 in such a manner that they are positioned alternately between the magnetic rings 21, 22 and 23. The magnetic rings 21, 22 and 23 of the second magnetic body section 20, to be rotated with the output shaft 2, are fixed to the mounting ring 6 in predetermined mutual relationship to be later described.

As seen in FIG. 17, a plurality of pins 51, 52, 53 and 54 extending in the axial direction to interconnect the magnetic rings 11 and 12 are provided on the mounting ring 5 to be connected to the output shaft 1. In assembly, a sleeve portion 5a of the mounting ring 5 is inserted into the sleeve portion 6a of the mounting ring 6. Each of the magnetic rings 21 and 23 associated with the output shaft 2 has a plurality of circumferentially-elongated through-holes SH formed in predetermined positions thereof to allow the connecting pins 51-54 of the mounting ring 5, associated with the input shaft, 1 to freely play or escape in the assembled state. On the other hand, each of the magnetic rings 11 and 12 associated with the input shaft 1 has a plurality of holes H formed in predetermined positions thereof so that the connecting pins 51-54 of the mounting ring 5 associated with the input shaft 1 can be fitted in the holes H in predetermined phase relationship as will be later described.

With such arrangements, the magnetic rings 11 and 12, alternately positioned between the magnetic rings 21, 22 and 23 fixed to the mounting ring 6 associated with the output shaft 2, are connected, via the connecting pins 51-54, to the mounting ring 5 associated with the input shaft 1, so that they can rotate together with the input shaft 1. Namely, the magnetic rings 11 and 12 of the input shaft 1 are freely rotatable relative to the sleeve portion 6a of the mounting ring 6 of the output shaft 2. At that time, the through-holes SH elongated in the circumferential direction serves to permit rotating movement of the connecting pins 51-54 caused by the rotation of the input shaft 1, although the pins 51-54 provided on the mounting ring 5 of the input shaft 1 loosely extend through the through-holes SH in each of the magnetic rings 21, 22 and 23 of the output shaft 2; thus, the two shafts 1 and 2 will never be locked by the provision of the connecting pins 51-54. Of course, the escape angle provided by each of the through-holes SH is set to be greater than the maximum angle of the torsion by the torsion bar 3.

Each of the magnetic rings 11, 12, 21, 22 and 23 is shaped to have a plurality of (eight in the illustrated example) magnetic concave/convex tooth portions (i.e., increase/decrease pattern of magnetic substance) along its circumference. By the provision of such concave/convex tooth portions (i.e., magnetic increase/decrease pattern), there are formed, in the assembled state, variable magnetic coupling boundary sections between the first magnetic rings and the second magnetic rings, adjoining one another via gaps. Because there are provided four boundaries between the three second magnetic rings 21, 22 and 23 and the two first magnetic rings 11 and 12, a total of four such variable magnetic coupling boundary sections are formed.

The above-mentioned coil section 30 comprises four coils L1, L2, L3 and L4 wound around the four variable magnetic coupling boundary sections formed between the magnetic rings 21, 11, 22, 12 and 23 in the assembled state as seen in FIG. 16. Namely, the coils L1-L4 are axially spaced apart at given intervals, and the four boundary sections, formed between the magnetic rings 21, 11, 22, 12 and 23 are inserted in inner spaces of the corresponding coils L1-L4.

Figure 18:
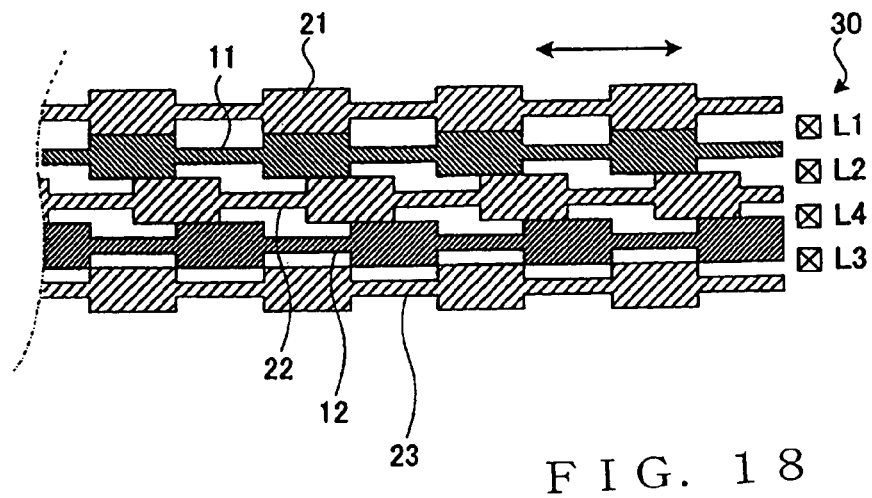
FIG. 18 is an expansion plan view of magnetic rings.

FIG. 18 is an expansion plan view of the magnetic rings 21, 11, 22, 12 and 23. Explaining positional arrangements of the magnetic rings 21, 22 and 23 of the second magnetic body section 20 rotatable with the output shaft 2, the magnetic rings 21 and 23 are positioned in such a manner that their repetition cycles agree with each other in phase, and the middle magnetic ring 22 is positioned in such a manner that its repetition cycle is phase-shifted by a quarter cycle from the repetition cycles of the magnetic rings 21 and 23. Because these magnetic rings 21, 22 and 23 are fixed to the mounting ring 6 in the above-mentioned predetermined mutual relationship, the predetermined mutual relationship can be constantly maintained despite the rotation of the output shaft 2. On the other hand, the magnetic rings 11 and 12 of the first magnetic body section 10 rotatable with the input shaft 10 are positioned to be phase-shifted from each other by one half (½) of the repletion cycle of the convex/concave tooth portions (namely, to assume mutually-opposite phases). These magnetic rings 11 and 12 rotate with the input shaft 1 while maintaining such mutual relationship.

With the above-mentioned positional shifts, variation phases in the four boundary sections differ, as set forth below, as the correspondency between the concave/convex tooth portions of the adjoining first and second magnetic rings varies in response to variation in the relative rotational position between the input shaft 1 and the output shaft 2.

For example, when the convex/concave tooth portions of the magnetic rings, adjoining each other via a gap, exactly agree in phase with each other as seen in each of the boundary sections between the magnetic rings 21 and 11 of FIG. 18, the magnetic coupling degree in that boundary section presents the maximum value, which may be regarded as corresponding to a value of sin 90° if converted, for example, into a sine function value. Further, when the convex/concave tooth portions of the magnetic rings, adjoining each other via a gap, are phase-shifted by just one half (½) of the cycle as seen in each of the boundary sections between the magnetic rings 12 and 23 of FIG. 4, the magnetic coupling degree in that boundary section presents the minimum value, which may be regarded as corresponding to a value of sin 270° or −sin 90° if converted, for example, into a sine function value. Namely, variation of the magnetic coupling in the each of the boundary sections between the magnetic rings 21 and 11 and variation of the magnetic coupling in the each of the boundary sections between the magnetic rings 12 and 23 assume mutually-opposite phase relationship. Further, when the convex/concave tooth portions of the magnetic rings, adjoining each other via a gap, are phase-shifted by just one-fourth (¼) of the cycle as seen in each of the boundary sections between the magnetic rings 11 and 12 of FIG. 4, the magnetic coupling degree in that boundary section presents a middle value between the maximum and minimum values, which may be regarded as corresponding to a value of cos 90° if converted, for example, into a sine function value. Furthermore, when the convex/concave tooth portions of the magnetic rings, adjoining each other via a gap, are shifted from each other by just one-fourth (¼) of the cycle in opposite phase to the above-mentioned as seen in each of the boundary sections between the magnetic rings 22 and 12 of FIG. 18, the magnetic coupling degree in that boundary section presents a middle value between the maximum and minimum values, which may be regarded as corresponding to a value of −cos 90° if converted, for example, into a sine function value.

The individual coils L1-L4 of the coil section 30 are energized by a common reference A.C. signal (e.g., sin ωt). As the magnetic coupling in each of the boundary sections of the individual groups a-d of the first and second magnetic body sections between the magnetic rings varies in response to variation in relative rotational position between the input shaft 1 and the output shaft 2, impedance of the coils L1-L4 corresponding to the boundary sections varies. The impedance variation occurs with rotational displacement, corresponding to one pitch of the convex/concave tooth portions of the magnetic rings 11-23, as one cycle thereof In the illustrated example, the rotational range corresponding to one pitch of the convex/concave tooth portions of the magnetic rings 11-23, is 360 degrees/16=about 22 degrees odd. Because the maximum angular range of the torsional deformation by the torsion bar 3 is about 12 degrees as noted above, the absolute value of the torsion amount can be detected with no problem by detecting an absolute rotational angle within the range of one pitch of the convex/concave tooth portions of the magnetic rings 11-23.

The impedance variation can be expressed as follows, using an angular variable θ based on an angle representation of a high-resolution scale where one pitch width (e.g., about 22 degrees) between the convex/concave tooth portions of the magnetic rings 11-23 is set at 360 degrees. Impedance variation A(θ) of an ideal sine function characteristic occurring in the coil L1 that produces an output responsive to the magnetic coupling in the boundary section between the magnetic rings 21 and 11 can be expressed equivalently, similarly to the aforementioned, by the following mathematical expression:

$A(\theta) = P_0 + P \sin \theta$

As set forth above, variation of the magnetic coupling in the boundary section between the magnetic rings sequentially shifts in phase by one-fourth of the cycle. Thus, ideal impedance variation B(θ) occurring in the coil L2 that produces an output responsive to the magnetic coupling in the boundary section between the magnetic rings 11 and 22 can be expressed equivalently, similarly to the aforementioned, by the following mathematical expression of a cosine function characteristic:

$B(\theta) = P_0 + P \cos \theta$

Furthermore, ideal impedance variation C(θ) occurring in the coil L3 that produces an output responsive to the magnetic coupling in the boundary section between the magnetic rings 12 and 23 can be expressed equivalently by the following mathematical expression of a minus sine function characteristic:

$C(\theta) = P_0 - P \sin \theta$

Furthermore, ideal impedance variation D(θ) occurring in the coil L4 that produces an output responsive to the magnetic coupling in the boundary section between the magnetic rings 22 and 12 can be expressed equivalently by the following mathematical expression of a minus cosine function characteristic:

$D(\theta) = P_0 - P \cos \theta$

Figure 19:
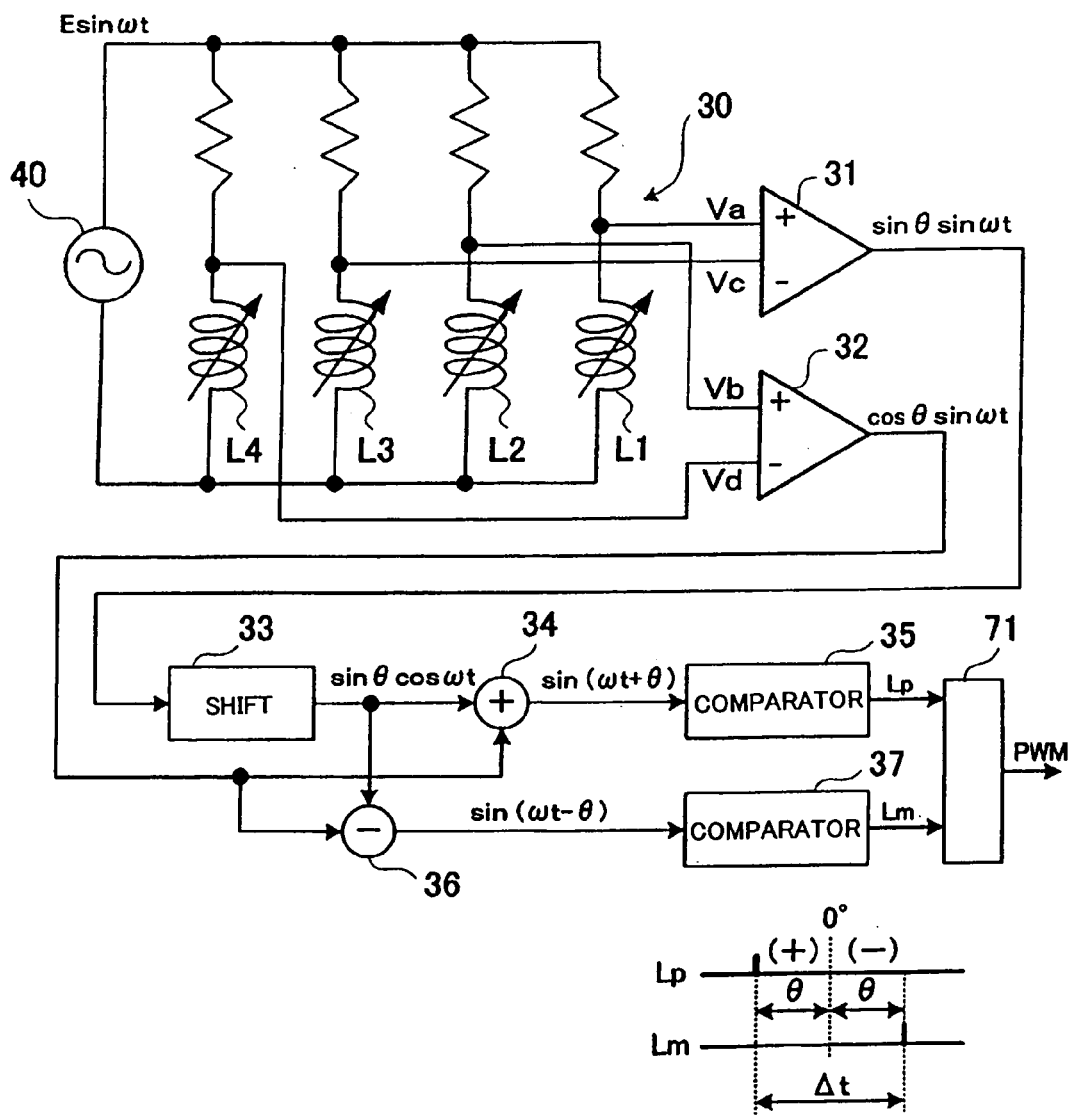
FIG. 19 is a diagram showing an example of electric circuitry related to a coil section of the relative-rotational-position detection apparatus (torque detection apparatus 4A) of FIG. 15.

FIG. 19 shows an example of electric circuitry applicable to the relative-rotational-position detection apparatus (torque detection apparatus 4A) of FIG. 15, which is substantially similar in construction to the electric circuitry of FIG. 3 and thus will not be described in detail here. In the embodiment of FIGS. 15-19 too, there can be obtained two output A.C. signals "sin θ sin •t" and "cos θ sin ωt" having been modulated in amplitude with two cyclic amplitude functions (sin θ and cos θ), respectively, that contain the angular variable θ correlating to a relative rotational position to be detected. On the basis of the thus-obtained output signals, there are generated detection pulses Lp and Lm of phase-advanced and phase-retarded signals indicating the phase angle θ correlating to a relative rotational position to be detected, as well as a variable pulse width signal PWM having a pulse width corresponding to a time difference Δt between the detection pulses Lp and Lm.

The detection system according to the embodiment shown in FIG. 15 integrally includes not only the function of the torque detection apparatus 4A for detecting torque applied to the torsion bar 3 of the power steering mechanism, but also the function of the steering angle detection apparatus 4B intended for purposes, such as correction of a difference in correspondency between a steering wheel angle corresponding to a rotational operation amount of the steering wheel and steered road wheels. Needless to say, the other embodiments shown in FIGS. 1-13 too may have such a function of the steering angle detection apparatus 4B, in addition to the function of the torque detection apparatus 4.

Describing now the steering angle detection apparatus 4B, it includes, in respective predetermined positions within the external case 41, a plurality of gears G1-G3, a stator section 100 and a rotor section 200 including a magnetism-responsive member 300. The gears G1-G3 constitute a gearing mechanism for rotating the rotor section 200 after reducing stepwise the number of rotations of the input shaft 2 coupled to the steering wheel; for example, the gearing mechanism reduces the number of rotations of the output shaft 2 at a predetermined ratio, e.g. one rotation of the rotor section 200 per five rotations of the output shaft 2, so that rotational positions over multiple rotations of the steering wheel can be detected via a one-rotation type absolute sensor.

Figure 20:
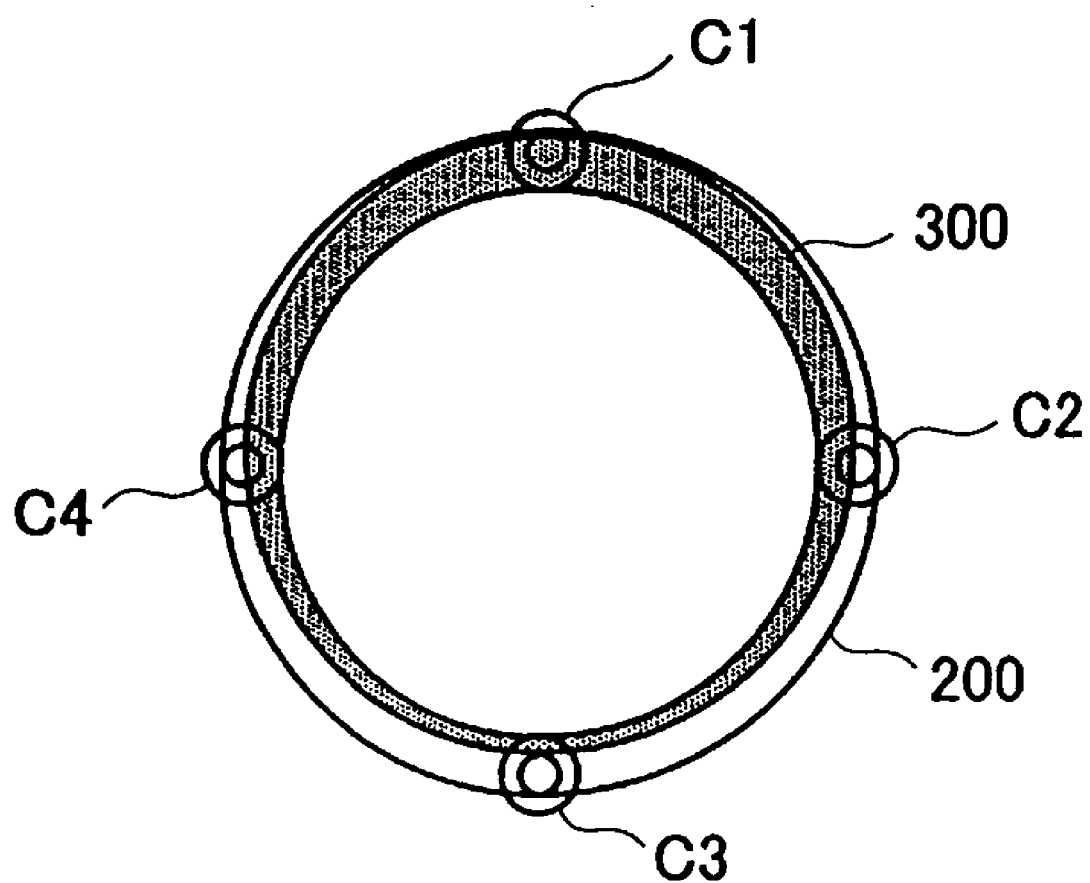
FIG. 20 is a schematic front view of an embodiment of a steering angle detection apparatus shown in FIG. 15.

FIG. 20 is a schematic view of an embodiment of the steering angle detection apparatus 4B, which particularly shows, in a schematic front view, physical positional relationship between the coils C1-C4 of the stator section 100 and the magnetism-responsive member 300 formed on the surface of the rotor section 200. The magnetism-responsive member 300 of a predetermined shape (e.g., eccentric shape) is formed on the surface of the rotor section 200 and rotates with the rotation of the rotor section 200. The stator section 100 includes, as detecting coils, the four coils C1-C4 (see FIG. 20), and magnetic flux passing through the coils C1-C4 is oriented in the axial direction. The stator section 100 and rotor section 200 are positioned in opposed relation to each other in such a manner that predetermined gaps are formed between respective end surfaces of coil cores (e.g., magnetic cores, such as iron cores) for the four coils C1-C4 of the stator section 100 and the magnetism-responsive member 300 formed on the surface of the rotor section 200, namely, that airgaps are formed between the end surfaces of the coil cores of the four coils C1-C4 and the magnetism-responsive member 300 formed on the surface of the rotor section 200. The rotor section 200 rotates relative to the stator section 100 in a noncontact fashion. Rotational angle of the output shaft, i.e. rotational angle of the steering wheel, can be detected by the area of the end surfaces of the coil cores of the coils C1-C4, opposed to the magnetism-responsive member 300, varying in response to a rotational position of the rotor section 200.

The instant embodiment of the steering angle detection apparatus 4B includes a one-rotation type absolute position detecting sensor based on the electromagnetic induction scheme as illustrated in FIG. 20, a plurality of gears G1-G3 of different gear ratios sequentially meshing with each other, the stator section 100, and the rotor section 200. The plurality of gears G1-G3 constitute a speed reducing mechanism for rotating the rotor section 200 after reducing stepwise the number of rotations of the output shaft 2 of the steering shaft. The gear 1 is coupled to the output shaft 2 and rotates in a similar manner to the output shaft 2, the speed-reducing gear G2 is meshed with the gear G1, and the speed-reducing gear G3 is meshed with the gear G2. The rotor section 200, formed for example into a disk shape, is provided on the gear G3 and rotates about the axial centerline CL as the gear G3 rotates. In this manner, the gears G1-G3 transmit the rotations of the output shaft 2 to the rotor section 200 after reducing the rotation speed.

On the surface of the rotor section 200, there are provided the magnetism-responsive member 300 of a predetermined shape, such as an eccentric ring shape as illustratively shown in FIG. 20. The magnetism-responsive member 300 may be formed of any suitable material that can cause a magnetic coupling coefficient to vary, such as a magnetic substance like iron, an electrically-conductive substance like copper, or a combination of such magnetic and electrically-conductive substances. The stator section 100 is opposed to the thus-constructed rotor section 200 in a thrust direction.

The predetermined shape of the magnetism-responsive member 300 formed on the surface of the rotor section 200 is chosen appropriately so as to obtain, from the coils C1-C4, ideal sine, cosine, minus sine and minus cosine curves. For example, the positions of the coils C1-C4 and the shape of the magnetism-responsive member 300 may be set such that, assuming that the impedance variation occurring in the coil C1 represents a sine function, the impedance variation occurring in the coil C2 represents a minus sine function, the impedance variation occurring in the coil C3 represents a cosine function and the impedance variation occurring in the coil C4 represents a minus cosine function. In such a case, the positions of the coils C1-C4 and the shape of the magnetism-responsive member 300 are set such that, per rotation of the rotor section 200, the impedance of the coil C1 varies in a sine function over the range of 0-360 degrees, the impedance of the coil C2 varies in a cosine function over the range of 0-360 degrees, the impedance of the coil C3 varies in a minus sine function over the range of 0-360 degrees and the impedance of the coil C4 varies in a minus cosine function over the range of 0-360 degrees. Because the impedance variation of the coils C1-C4 can be likened to variation in sine and cosine function values over the range of 0-360 degrees as noted above, one rotation of the rotor section 200 can be measured by being converted into variation in the 360° range.

With the above-described arrangements, the impedance of the pair of the coils C1 and C3 vary differentially, and an output A.C. signal "$\sin \theta \sin \omega t$" having the sine function "$\sin \theta$" as its amplitude coefficient can be obtained by differential synthesis of the respective outputs of the coils C1 and C3. Further, the impedance of the other pair of the coils C2 and C4 vary differentially, and an output A.C. signal "$\cos \theta \sin \omega t$" having the cosine function "$\cos \theta$" as its amplitude coefficient can be obtained by differential synthesis of the respective outputs of the coils C2 and C4. Rotational position can be detected by synthesizing, on the basis of such output signals similar to those of a resolver, an A.C. signal phase-shifted by an amount corresponding to $\theta$ and then measuring the phase shift value $\theta$. In this way, rotational angles, over multiple rotations (e.g., 2.5-3 rotations), of the steering wheel can be detected in absolute values by being converted into absolute rotational positions within one rotation of the rotor section 200.

The predetermined shape of the magnetism-responsive member 300, intended to obtain the sine, cosine, minus sine and minus cosine function curves in the predetermined angular range in response to rotation of the rotor section 200, may be any suitable shape other than the above-mentioned eccentric ring shape, such as a spiral shape, heart-like shape or the like depending on the design settings like the positions, shapes etc. of the coils and coil cores. Because how to design the shape of the magnetism-responsive member 300 is not an object of the present invention and any one of the shapes of magnetism-responsive members employed in publicly-known and unknown variable-magnetic-resistance-based rotation detectors of the above-described type may be used, no further description will be given about the shape of the magnetism-responsive member 300.

Note that the steering angle detection apparatus 4B is not limited to the above-described construction and may be constructed in any other suitable manner. For example, the speed-reducing mechanism constituted by the gears G1-G3 may be dispensed with, and the rotor section 200 may be coupled to the output shaft 2 (or input shaft 1) at a rotation ratio of 1:1. In such a case, only a rotational angle of the steering wheel within one rotation has to be detected in an absolute value, and a rotational angle of the steering wheel exceeding one rotation may be detected by a number-of-rotation count; also, the steering angle detection apparatus 4B may be dispensed with.

In the above-described torque detection apparatus 4 and 4A and/or steering angle detection apparatus 4B, the arrangement pattern, numbers, sizes, etc. of the magnetism-responsive member and coils corresponding thereto are not limited to the above-described and various other arrangement patterns etc. are possible; in short, any suitable arrangement pattern etc. of the magnetism-responsive member and coils may be used as long as they allow output signals of two phases (sine and cosine phases) to be produced from the coil section. Of course, the terms "sine phase" and "cosine phase" used herein are designations selected only for purposes of description, and either one of the two phases may be referred to as the sine phase or cosine phase.

Further, the rotational position detection means of the phase-shift type is not limited to the above-described construction and may be constructed in any suitable manner. For example, the rotational position detection means is not limited to the type having the primary coil alone, and it may be of a type having primary and secondary coils or of a resolver type. In another alternative, there may be employed an energization scheme where two-phase A.C. signals of a sine wave sin ωt and cosine wave cos ωt are used as reference A.C. signals.

Further, in the embodiment of FIGS. 15-20, the number of the concave/convex tooth portions (i.e., number of pitches per rotation) of each of the magnetic rings 11-23 may be other than eight as noted above. In another alternative, each of the magnetic rings 11-23 may be of other than the type having multiple tooth portions, such as a type which causes magnetic coupling variation (i.e., impedance variation of the coil) of one pitch (one cycle) per rotation. Further, the construction for causing the magnetic coupling to increase or decrease in response to the rotation may be based on other than the concave/convex tooth portions as used in the illustrated examples, such as tooth portions of a wave shape or other suitable shape. Furthermore, the material of the magnetic body sections 10 and 20, i.e. each of the magnetic rings 11-23, is not limited to the one consisting of a magnetic substance alone and may alternatively be of a hybrid type of magnetic and diamagnetic substances where the diamagnetic substance (nonmagnetic and good electrically-conductive substance, such as copper) is embedded in a recessed portion (where the magnetic coupling is to be decreased) of the magnetic substance. Needless to say, each of the components that should have no magnetism-responsive characteristic is made of a material having no magnetism-responsive characteristic, such as synthetic resin. In the embodiments of FIGS. 1-14 too, the shapes, materials, etc. of the magnetic body sections 10, 20, 101, 201, 102, 202 may be modified variously similarly to the aforementioned.

The invention claimed is:

1. A relative rotational position detection apparatus for detecting a relative rotational position between first and second shafts rotatable relative to each other, the relative rotational position detection apparatus comprising:

a first magnetic body section provided to rotate in intercoupled relation to rotation of the first shaft;

a second magnetic body section provided to rotate in intercoupled relation to rotation of the second shaft, wherein said first magnetic body section and said second magnetic body section form at least two ring-shaped variable magnetic coupling sections opposed to each other via a gap, and a plurality of magnetic coupling boundary sections that form magnetic couplings, the magnetic coupling in each of the magnetic coupling boundary sections varying in response to variation of the relative rotational position between said first shaft and said second shaft, and variation of the magnetic coupling differing in phase between the boundary sections; and a coil section including detecting coils each provided in corresponding relation to one of the magnetic coupling boundary sections, wherein the first and second magnetic body sections each include magnetic teeth that differ in length, and wherein opposing teeth of the first and second magnetic body sections form the magnetic coupling boundary sections.

2. A relative rotational position detection apparatus as claimed in claim 1, further comprising a circuit for synthesizing respective output signals of the coils of said coil section, to thereby generate an output A.C. signal shifted in phase from a reference A.C. signal in accordance with a relative rotational position between said first shaft and said second shaft.

3. A relative rotational position detection apparatus as claimed in claim 1, wherein one of the magnetic coupling boundary sections presents magnetic coupling variation of a sine characteristic in response to variation of the relative rotational position between said first shaft and said second shaft, and another of the magnetic coupling boundary sections presents magnetic coupling variation of a cosine characteristic in response to variation of the relative rotational position between said first shaft and said second shaft.

4. A relative rotational position detection apparatus as claimed in claim 1, wherein each of the coils of said coil section is a single coil to be energized by a predetermined reference A.C. signal, impedance of the single coil is determined in accordance with magnetic coupling of the magnetic coupling boundary section corresponding to said coil, and said coil generates an output A.C. signal having an amplitude corresponding to the impedance.

5. A relative rotational position detection apparatus as claimed in claim 1, wherein said first and second shafts are interconnected by a torsion bar, and a torsion amount between said first and second shafts is detected as the relative rotational position.

6. A relative rotational position detection apparatus as claimed in claim 1, wherein said first and second shafts are a power steering input shaft and output shaft of a motor vehicle.

7. A relative rotational position detection apparatus for detecting a relative rotational position between first and second shafts rotatable relative to each other, the relative rotational position detection apparatus comprising:

a first magnetic body section provided to rotate in intercoupled relation to rotation of the first shaft;

a second magnetic body section provided to rotate in intercoupled relation to rotation of the second shaft, wherein said first magnetic body section and said second magnetic body section form at least two ring-shaped variable magnetic coupling sections opposed to each other via a gap, and a plurality of magnetic coupling boundary sections that form magnetic couplings, the magnetic coupling in each of the magnetic coupling boundary sections varying in response to variation of the relative rotational position between said first shaft and said second shaft, and variation of the magnetic coupling differing in phase between the magnetic coupling boundary sections; and a coil section including detecting coils each provided in corresponding relation to one of the magnetic coupling boundary sections, wherein said first and second magnetic body sections each comprise a cylindrical member having a plurality of magnetic teeth formed at unequal pitches along a circumferential direction thereof, wherein the plurality of magnetic teeth form groups corresponding to the plurality of magnetic coupling boundary sections, wherein the magnetic teeth in each of said first and second magnetic body sections differ in axial length among the groups, and wherein the magnetic teeth of each of the groups in said first and second magnetic body sections are opposed to each other to thereby form the magnetic coupling boundary section corresponding to the group, so that the individual magnetic coupling boundary sections are provided in positions axially offset from one another.

8. A relative rotational position detection apparatus for detecting a relative rotational position between first and second shafts rotatable relative to each other, the relative rotational position detection apparatus comprising:

a first magnetic body section provided to rotate in intercoupled relation to rotation of the first shaft;

a second magnetic body section provided to rotate in intercoupled relation to rotation of the second shaft, wherein said first magnetic body section and said second magnetic body section form at least two ring-shaped variable magnetic coupling sections opposed to each other via a gap, and a plurality of magnetic coupling boundary sections that form magnetic couplings, the magnetic coupling in each of the magnetic coupling boundary sections varying in response to variation of the relative rotational position between said first shaft and said second shaft, and variation of the magnetic coupling differing in phase between the magnetic coupling boundary sections; and a coil section including detecting coils each provided in corresponding relation to one of the magnetic coupling boundary sections, wherein said first magnetic body section has a plurality of first magnetic rings axially spaced apart from each other, wherein said second magnetic body section has a plurality of second magnetic rings axially spaced apart from each other, wherein each of said second magnetic rings is positioned alternately between said first magnetic rings and connected with each other via connection means for rotation with said second shaft, and wherein opposed surfaces of said first magnetic rings and said second magnetic rings form an increase/decrease pattern of magnetic substance in such a manner that said magnetic coupling boundary sections are formed between adjoining ones of the plurality of first magnetic rings and the plurality of second magnetic rings.

9. A relative rotational position detection apparatus as claimed in claim 8, wherein:

four said magnetic coupling boundary sections are formed between adjoining ones of the plurality of first magnetic rings and the plurality of second magnetic rings, and a first one of said magnetic coupling boundary sections presents magnetic coupling variation of a sine characteristic in response to variation of the relative rotational position between said first shaft and said second shaft, a second one of said magnetic coupling boundary sections presents magnetic coupling variation of a cosine characteristic in response to variation of the relative rotational position between said first shaft and said second shaft, a third one of said magnetic coupling boundary sections presents magnetic coupling variation of a minus sine characteristic in response to variation of the relative rotational position between said first shaft and said second shaft, and a fourth one of said magnetic coupling boundary sections presents magnetic coupling variation of a minus cosine characteristic in response to variation of the relative rotational position between said first shaft and said second shaft.

* * * * *